(12) United States Patent
Tamura et al.

(10) Patent No.: US 8,594,650 B2
(45) Date of Patent: Nov. 26, 2013

(54) MOBILE COMMUNICATION SYSTEM AND METHOD OF CONTROLLING THE SAME, AND RADIO BASE STATION APPARATUS

(75) Inventors: Tomu Tamura, Tokyo (JP); Yoshio Ueda, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/498,395

(22) PCT Filed: Sep. 14, 2010

(86) PCT No.: PCT/JP2010/005612
§ 371 (c)(1),
(2), (4) Date: Apr. 3, 2012

(87) PCT Pub. No.: WO2011/039958
PCT Pub. Date: Apr. 7, 2011

(65) Prior Publication Data
US 2012/0184261 A1    Jul. 19, 2012

(30) Foreign Application Priority Data
Oct. 2, 2009  (JP) .................. 2009-230859

(51) Int. Cl.
*H04W 52/02* (2009.01)
*H04W 64/00* (2009.01)
(52) U.S. Cl.
USPC ......... 455/418; 455/522; 455/456.6; 455/433
(58) Field of Classification Search
USPC .......... 455/414.1, 418–420, 422.1, 561, 13.4, 455/522, 127.1–127.5; 370/317
See application file for complete search history.

(56) References Cited

U.S. PATENT DOCUMENTS

| 6,006,096 A | 12/1999 | Trompower |
| 7,305,247 B2 | 12/2007 | Sato et al. |

(Continued)

FOREIGN PATENT DOCUMENTS

| CN | 1523908 A | 8/2004 |
| CN | 101347008 A | 1/2009 |

(Continued)

OTHER PUBLICATIONS

3rd Generation Partnership Project; Technical Specification Group Radio Access Network; UTRAN Iu interface Radio Access Network Application Part (RANAP)signalling (Release 8). Jun. 2009.*

(Continued)

*Primary Examiner* — Kashif Siddiqui
(74) *Attorney, Agent, or Firm* — Foley & Lardner LLP

(57) ABSTRACT

A mobile communication system according to the present invention capable of efficiently reducing power consumption of a radio base station apparatus includes a radio base station apparatus 1 for performing communication with a mobile terminal 4, a location information management apparatus 3 for acquiring location information of the mobile terminal 4, and a processing apparatus 2 for changing an operation state of the radio base station apparatus 1 by changing at least one of intensity, type, and cycle of radio waves emitted from the radio base station apparatus 1 or by setting the radio base station apparatus 1 in such a way that the radio base station apparatus 1 does not emit radio waves based on the location information of the mobile terminal 4 acquired by the location information management apparatus 3.

21 Claims, 23 Drawing Sheets

(56) References Cited

U.S. PATENT DOCUMENTS

| | | | |
|---|---|---|---|
| 7,512,381 | B1 | 3/2009 | Sylvain |
| 8,248,979 | B2 | 8/2012 | Kleindl |
| 2002/0025824 | A1* | 2/2002 | Lin ............................. 455/456 |
| 2008/0188241 | A1 | 8/2008 | Mo et al. |
| 2009/0163238 | A1* | 6/2009 | Rao et al. ..................... 455/522 |
| 2010/0056184 | A1 | 3/2010 | Vakil et al. |
| 2010/0151852 | A1 | 6/2010 | Mori et al. |
| 2011/0124366 | A1 | 5/2011 | Hosono |
| 2011/0183648 | A1 | 7/2011 | Takagi |
| 2011/0281592 | A1 | 11/2011 | Tamura |

FOREIGN PATENT DOCUMENTS

| | | |
|---|---|---|
| DE | 10 2005 051 291 A1 | 5/2007 |
| EP | 1 750 470 A1 | 2/2007 |
| EP | 2 073 574 A1 | 6/2009 |
| EP | 2 086 265 A2 | 8/2009 |
| EP | 2 187 698 A1 | 5/2010 |
| JP | 2-285797 A | 11/1990 |
| JP | 10-23519 A | 1/1998 |
| JP | 10-98759 A | 4/1998 |
| JP | 10-260244 A | 9/1998 |
| JP | 2001-102995 A | 4/2001 |
| JP | 2003-347985 A | 12/2003 |
| JP | 2007-134840 A | 5/2007 |
| JP | 2008-60854 A | 3/2008 |
| JP | 2008-109423 A | 5/2008 |
| JP | 2008-530897 A | 8/2008 |
| JP | 2008-252330 A | 10/2008 |
| JP | 2009-159355 A | 7/2009 |
| JP | 2009-182619 A | 8/2009 |
| KR | 2001-0004627 A | 1/2001 |
| WO | WO-02/07464 A1 | 1/2002 |
| WO | WO-2008/136416 A1 | 11/2008 |
| WO | WO 2009/022534 A1 | 2/2009 |
| WO | WO 2009/148164 A1 | 12/2009 |
| WO | WO 2010/044366 A1 | 4/2010 |

OTHER PUBLICATIONS

"3rd Generation Partnership Project; Technical Specification Group Radio Access Network; User Equipment (UE) procedures in idle mode and procedures for cell reselection in connected mode (Release 8)" 3GPP Standard; 3GPP TS 25.304, 3rd Generation Partnership Project (3GPP); Dec. 1, 2008; pp. 1-46; France.

"3rd Generation Partnership Project; Technical Specification Group Services and Systems Aspects; Network architecture (Release 8)" 3GPP Standard; 3GPP TS 23.002, 3rd Generation Partnership Project (3GPP); Dec. 1, 2008; pp. 1-88; France.

Extended European Search Report issued in European Patent Application No. 10738315.0-1246; Aug. 21, 2012; 10 pages.

Notice of Reasons for Rejection issued in Japanese Application No. 2010-549378 with partial English translation; Aug. 28, 2012; 6 pages.

Office Action issue in U.S. Appl. No. 13/143,418; Jun. 13, 2012; 13 pages.

International Search Report, PCT/JP2010/000461, May 11, 2010, 1 page.

USPTO Office Action, U.S. Appl. No. 13/143,418, Dec. 8, 2011, 11 pages.

USPTO Office Action, U.S. Appl. No. 13/143,418, Jan. 16, 2013, 15 pages.

Tejas Bhatt et al., A Method for Interference Control and Poer Saving for Home Access Point, IP.COM Journal, Nokia Siemes Networks, Dec. 2007, pp. 1-3.

3GPP TSG RAN WG3 Meeting #59bis, Dynamic Setup of HNBs for Energy Savings and Interference Reuction, Mar. 2008, pp. 1-6, vol. R3-080658.

* cited by examiner

Fig. 4

OPERATIONAL STATE CHANGE
This message is sent by the CN to indicate to RNC that operational state shall be changed according to the IE.
Direction: CN → RNC
Signalling bearer mode: Connection less.

| IE/Group Name | Presence | Range | IE type and reference | Semantics description | Criticality | Assigned Criticality |
|---|---|---|---|---|---|---|
| Message Type | M | | 9.2.1.1 | | - | |
| Choice Operational State | | | | | | |
| >Power On | | | | | - | |
| >Power Off | | | | | - | |
| >Save Mode | | | | | - | |
| >>radio field intensity | O | | | | - | |
| >>sort of signals | O | | | | - | |
| >>period | O | | | | - | |
| ... | | | | | | |

Fig. 6

9.1.9 HNB DE-REGISTER
This message is sent by the HNB to the HNB-GW or HNB-GW to HNB to deregister the HNB.
Direction:    HNB → HNB-GW or HNB-GW → HNB

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| Cause | M | | 9.2.15 | | YES | ignore |
| Backoff Timer | C-ifOverload | | 9.2.28 | | YES | reject |
| PowerOff | O | | | | | ignore |

| Condition | Explanation |
|---|---|
| IfOverload | This IE shall be present if the Cause IE is set to "Overload". |

Fig. 8

HNB CONFIGURATION
This message is sent by HNB-GW to HNB to indicate that operational state shall be changed according to the IE.
Direction: HNB-GW → HNB

| IE/Group Name | Presence | Range | IE type and reference | Semantics description | Criticality | Assigned Criticality |
|---|---|---|---|---|---|---|
| Message Type | M | | 9.2.1 | | - | |
| Choice Operational State | | | | | | |
| >Power On | | | | | - | |
| >Power Off | | | | | - | |
| >Save Mode | | | | | - | |
| >>radio field intensity | O | | | | - | |
| >>sort of signals | O | | | | - | |
| >>period | O | | | | - | |
| ... | | | | | | |

UE EXISTENCE INDICATION
This message is sent by the CN to indicate to RNC whether UE camps on the cell or not.
Direction: CN → RNC
Signalling bearer mode: Connection less.

| IE/Group Name | Presence | Range | IE type and reference | Semantics description | Criticality | Assigned Criticality |
|---|---|---|---|---|---|---|
| Message Type | M | | 9.2.1.1 | | - | |
| Choice number of UE in location | | | | | | |
| >LAI | | | | | | |
| >>PLMN Identity | M | | | | - | |
| >>LAC | O | | | | - | |
| >>RAC | O | | | | - | |
| >>Number of UE | M | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>Number of UE in each radius | | 1 to <MaxnoofUEsperradius> | | | | |
| >>>radius | O | | | | - | |
| >>>Number of UE | O | | | | - | |
| ... | | | | | | |

Fig. 9

UE EXISTENCE INDICATION
This message is sent by the HNB-GW to indicate to HNB whether UE camps on the cell or not.
Direction: HNB-GW → HNB

| IE/Group Name | Presence | Range | IE type and reference | Semantics description | Criticality | Assigned Criticality |
|---|---|---|---|---|---|---|
| Message Type | M | | 9.2.1 | | - | |
| Choice number of UE in location | | | | | | |
| >LAI | | | | | | |
| >>PLMN Identity | M | | | | - | |
| >>LAC | O | | | | - | |
| >>RAC | O | | | | - | |
| >>Number of UE | M | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>Number of UE in each radius | | 1 to <Maxno ofUEspe rradius> | | | | |
| >>>radius | O | | | | - | |
| >>>Number of UE | O | | | | - | |
| ... | | | | | | |

Fig. 10

INQUIRE UE EXISTENCE
This message is sent by the RNC to ask CN to tell whether UEs camps on or not .
Direction: RNC → CN
Signalling bearer mode: Connection less.

| IE/Group Name | Presence | Range | IE type and reference | Semantics description | Criticality | Assigned Criticality |
|---|---|---|---|---|---|---|
| Message Type | M | | 9.2.1.1 | | - | |
| Choice number of UE in location | | | | | | |
| >LAI | | | | | | |
| >>PLMN Identity | M | | | | - | |
| >>LAC | O | | | | - | |
| >>RAC | O | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>radius | O | 1 to <Maxno ofUEsp erradius > | | | - | |
| ... | | | | | | |

Fig. 11

INQUIRE UE EXISTENCE
This message is sent by the HNB to ask HNB-GW to tell whether UEs camps on or not .
Direction: HNB→HNB-GW

| IE/Group Name | Presence | Range | IE type and reference | Semantics description | Criticality | Assigned Criticality |
|---|---|---|---|---|---|---|
| Message Type | M | | 9.2.1 | | - | |
| Choice number of UE in location | | | | | | |
| >LAI | | | | | | |
| >>PLMN Identity | M | | | | - | |
| >>LAC | O | | | | - | |
| >>RAC | O | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>radius | O | 1 to <MaxnoofUEsperradius> | | | - | |
| ... | | | | | | |

OPERATIONAL STATE CHANGE
This message is sent by MME to eNB to indicate that operational state shall be changed according to the IE.
Direction: MME → eNB/HeNB

| IE/Group Name | Presence | Range | IE type and reference | Semantics description | Criticality | Assigned Criticality |
|---|---|---|---|---|---|---|
| Message Type | M | | 9.2.1.1 | | - | |
| Choice Operational State | | | | | | |
| >Power On | O | | | | - | |
| >Power Off | O | | | | - | |
| >Save Mode | O | | | | - | |
| >>radio field intensity | | | | | - | |
| >>sort of signals | | | | | - | |
| >>period | | | | | | |
| ... | | | | | | |

UE EXISTENCE INDICATION
This message is sent by the MME to indicate to eNB/HeNB whether UE camps on the cell or not.
Direction: MME →eNB/HeNB

| IE/Group Name | Presence | Range | IE type and reference | Semantics description | Criticality | Assigned Criticality |
|---|---|---|---|---|---|---|
| Message Type | M | | 9.2.1.1 | | - | |
| Choice number of UE in location | | | | | | |
| >TAI | | | | | | |
| >>PLMN Identity | M | | | | - | |
| >>TAC | M | | | | - | |
| >>Number of UE | M | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>Number of UE in each radius | | 1 to <Maxno ofUEsp erradius> | | | | |
| >>>radius | O | | | | - | |
| >>>Number of UE | O | | | | - | |
| ... | | | | | | |

Fig. 18

INQUIRE UE EXISTENCE
This message is sent by the eNB/HeNB to ask MME to tell whether UEs camps on or not .
Direction: eNB/HeNB→MME

| IE/Group Name | Presence | Range | IE type and reference | Semantics description | Criticality | Assigned Criticality |
|---|---|---|---|---|---|---|
| Message Type | M | | 9.2.1.1 | | - | |
| Choice number of UE in location | | | | | | |
| >TAI | | | | | | |
| >>PLMN Identity | M | | | | - | |
| >>TAC | M | | | | - | |
| ... | | | | | | |
| >Geographical location | | | | | | |
| >>center | | | | | | |
| >>>latitude | M | | | | - | |
| >>>longitude | M | | | | - | |
| >>>altitude | O | | | | - | |
| >>radius | O | 1 to <Maxno ofUEsp erradius > | | | - | |
| ... | | | | | | |

Fig. 19

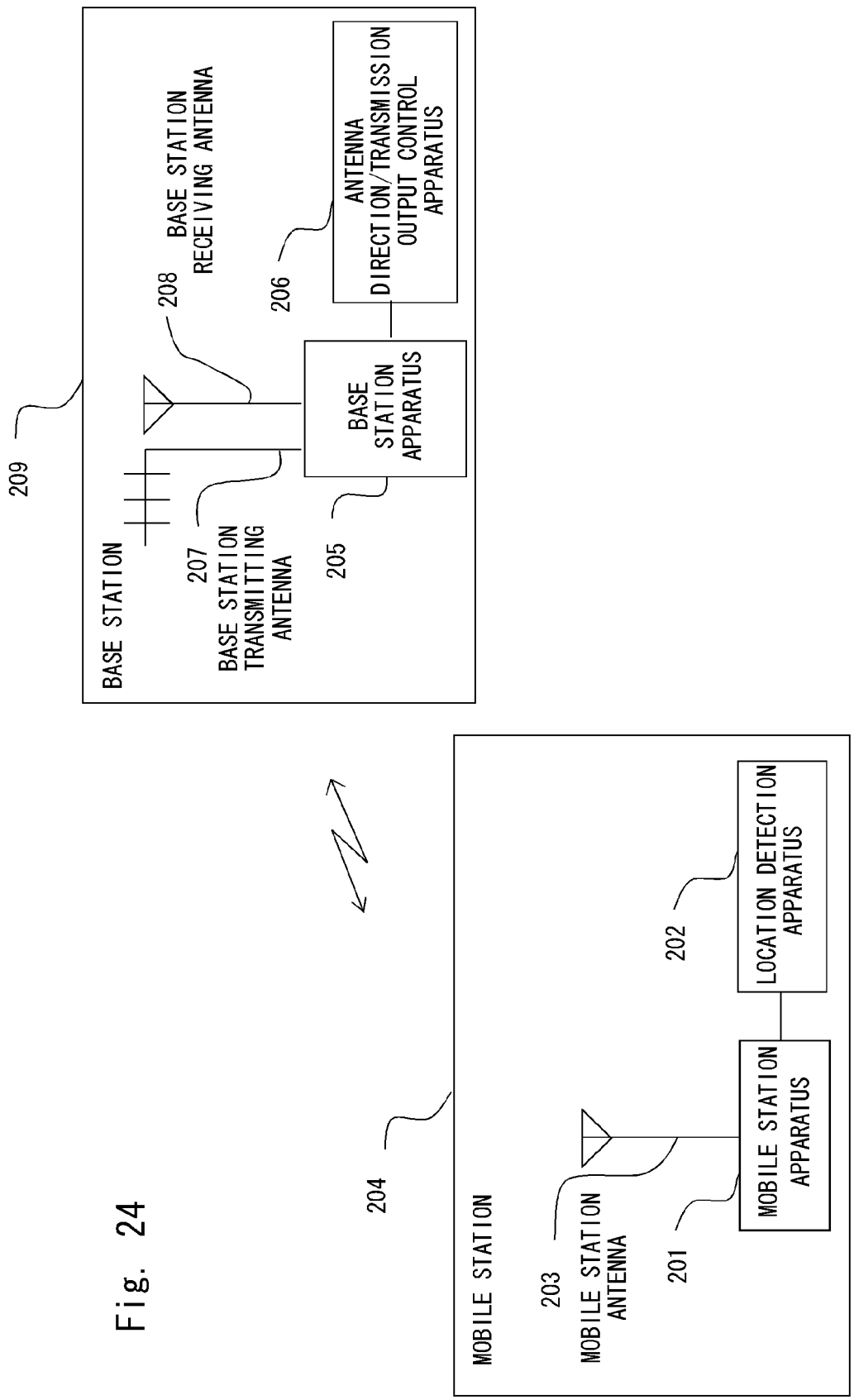

MOBILE COMMUNICATION SYSTEM AND METHOD OF CONTROLLING THE SAME, AND RADIO BASE STATION APPARATUS

This application is the National Phase of PCT/2010/005612, filed Sep. 14, 2010, which claims priority to Japanese Application No. 2009-230859, filed Oct. 2, 2009, the disclosures of which are hereby incorporated by reference in their entirety.

TECHNICAL FIELD

The present invention relates to a mobile communication system and a method of controlling the same, and more specifically, to a mobile communication system and a method of controlling the same to achieve power saving in a radio base station.

BACKGROUND ART

A mobile communication system includes a radio access network (RAN) and a core network (CN). Typically, the RAN includes a radio base station apparatus that directly communicates with a mobile terminal, and a control apparatus that controls the radio base station apparatus. Further, the CN serves as a switching equipment of speech communication and packet communication.

The radio base station apparatus in the mobile communication system is operated after execution of various tests and setting of various parameters. Accordingly, the radio base station apparatus is able to provide a service area, which is an environment where communication is possible, for a mobile terminal.

Meanwhile, a technique of reducing power consumption by a radio base station apparatus has recently been attracting attention. This is due to the strong demands for reduction in cost of communication not only in typical radio base station apparatuses but also in radio base station apparatuses that are provided by general consumers or corporations at home or offices.

A patent literature 1 discloses a technique related to reduction in power consumption by a radio base station apparatus. FIG. 23 is a diagram for describing a radio base station apparatus according to the patent literature 1. In FIG. 23, a radio base station apparatus 100 includes a controller 120 that transmits/receives a signal 170 to/from a network 160, and signal processors 130_1 to 130_5 respectively transmitting/receiving transmission/reception signals 171_1 to 171_5 to/from the controller 120. The radio base station apparatus 100 further includes a transmitter/receiver 140 that transmits/receives transmission/reception signals 172_1 to 172_5 transmitted/received to/from these signal processors to/from a mobile terminal through an antenna 150. The controller 120 controls the signal processors 130_1 to 130_5 by transmitting/receiving control signals 181_1 to 181_5, respectively, and controls the transmitter/receiver 140 by a control signal 182. Further, the controller 120 is connected to a terminal number estimation unit 110, and acquires an estimated value of the number of terminals using a signal 180.

In the radio base station apparatus shown in FIG. 23, the terminal number estimation unit 110 estimates the number of mobile terminals present in a service area on the basis of the number of location registrations of the mobile terminals, the number of access request messages from the mobile terminals, or the number of incoming call notification messages to the mobile terminals. Further, the controller 120 turns off power supplies of unnecessary signal processors 130_1 to 130_5 on the basis of the estimated number of the mobile terminals.

Further, a patent literature 2 discloses a technique related to a mobile radio antenna control system using a global positioning system (GPS). FIG. 24 shows the mobile radio antenna control system disclosed in the patent literature 2. In FIG. 24, a base station 209 includes a base station apparatus 205, an antenna direction/transmission output control apparatus 206, a base station receiving antenna 208, and a base station transmitting antenna 207. Further, a mobile station 204 includes a mobile station apparatus 201, a location detection apparatus 202, and a mobile station antenna 203.

The mobile radio antenna control system according to the patent literature 2 calculates at which location the mobile station 204 is present based on the location information received by the base station apparatus 205. The patent literature 2 discloses a technique that the base station apparatus 205 transmits radio waves having directivity in an optimum transmission direction with an optimum transmission output in consideration of the location of the mobile station 204.

Further, patent literatures 3 to 6 disclose a technique related to power saving in a radio communication system and a radio base station apparatus.

CITATION LIST

Patent Literature

PTL 1: Japanese Unexamined Patent Application Publication No. 2003-347985
PTL 2: Japanese Unexamined Patent Application Publication No. 2001-102995
PTL 3: Japanese Unexamined Patent Application Publication No. 2008-060854
PTL 4: Japanese Unexamined Patent Application Publication No. 2008-109423
PTL 5: Japanese Unexamined Patent Application Publication No. 2009-159355
PTL 6: Japanese Unexamined Patent Application Publication No. 2009-182619

SUMMARY OF INVENTION

Technical Problem

However, according to the technique disclosed in the patent literature 1, not all the power supplies of the signal processors 130_1 to 130_5 are turned off even when there is no mobile terminal that exists in a certain area but radio waves are constantly emitted. Further, other parts than the signal processors keep operating, which results in electric power being consumed even when there is no mobile terminal that exists in the certain area.

Further, also in the technique disclosed in the patent literature 2, the radio base station apparatus keeps emitting radio waves even when there is no terminal that exists in the certain area, which means that electric power is consumed.

As stated above, the techniques disclosed in the patent literature 1 and the patent literature 2 have the problem that it is impossible to efficiently reduce power consumption in a radio base station apparatus.

An exemplary object in view of the above problems is to provide a mobile communication system and a method of controlling the same, and a radio base station apparatus that are capable of efficiently reducing power consumption in the radio base station apparatus.

Solution to Problem

A mobile communication system according to the present invention includes: a radio base station apparatus for performing communication with a mobile terminal; a location information management apparatus for acquiring location information of the mobile terminal; and a processing apparatus for changing an operation state of the radio base station apparatus by changing at least one of intensity, type, and cycle of radio waves emitted from the radio base station apparatus or by setting the radio base station apparatus in such a manner that the radio base station apparatus does not emit radio waves based on location information of the mobile terminal acquired by the location information management apparatus.

A radio base station apparatus according to the present invention includes: location information acquisition means for acquiring location information of a mobile terminal; and operation state change means for changing an operation state of the radio base station apparatus by changing at least one of intensity, type, and cycle of radio waves emitted from the radio base station apparatus or by setting the radio base station apparatus in a such a manner that the radio base station apparatus does not emit radio waves based on the location information of the mobile terminal.

A processing apparatus according to the present invention includes: location information acquisition means for acquiring location information of a mobile terminal; and operation state change means for changing an operation state of the radio base station apparatus by changing at least one of intensity, type, and cycle of radio waves emitted from the radio base station apparatus or by setting the radio base station apparatus in such a manner that the radio base station apparatus does not emit radio waves based on the location information of the mobile terminal.

A method of controlling a mobile communication system according to the present invention includes: acquiring location information of a mobile terminal for performing communication with a radio base station apparatus; and changing an operation state of the radio base station apparatus by changing at least one of intensity, type, and cycle of radio waves emitted from the radio base station apparatus or by setting the radio base station apparatus in such a manner that the radio base station apparatus does not emit radio waves based on the location information of the mobile terminal.

Advantageous Effects of Invention

According to the present invention, it is possible to provide a mobile communication system and a method of controlling the same, and a radio base station apparatus that are capable of efficiently reducing power consumption in a radio base station apparatus.

BRIEF DESCRIPTION OF DRAWINGS

FIG. 4 is a diagram showing parameters used in the mobile communication system according to the second exemplary embodiment;

FIG. 6 is a diagram showing parameters used in the mobile communication system according to the second exemplary embodiment;

FIG. 8 is a diagram showing parameters used in the mobile communication system according to the second exemplary embodiment;

FIG. 9 is a diagram showing parameters used in the mobile communication system according to the second exemplary embodiment;

FIG. 10 is a diagram showing parameters used in the mobile communication system according to the second exemplary embodiment;

FIG. 11 is a diagram showing parameters used in the mobile communication system according to the second exemplary embodiment;

FIG. 12 is a diagram showing parameters used in the mobile communication system according to the second exemplary embodiment;

FIG. 17 is a diagram showing parameters used in the mobile communication system according to the third exemplary embodiment;

FIG. 18 is a diagram showing parameters used in the mobile communication system according to the third exemplary embodiment;

FIG. 19 is a diagram showing parameters used in the mobile communication system according to the third exemplary embodiment;

FIG. 24 is a diagram for describing a mobile radio antenna control system according to a related art.

DESCRIPTION OF EMBODIMENTS

First Exemplary Embodiment

Figure 1:
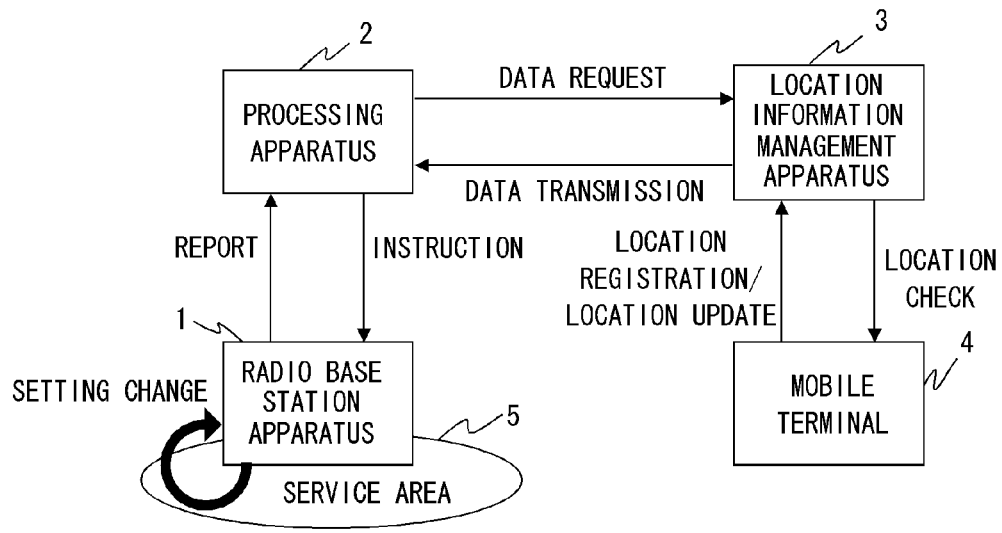
FIG. 1 is a block diagram for describing a mobile communication system according to a first exemplary embodiment.

Hereinafter, a first exemplary embodiment of the present invention will be described with reference to the drawings. FIG. 1 is a diagram for describing a mobile communication system according to the first exemplary embodiment. The mobile communication system according to the first exemplary embodiment includes a radio base station apparatus 1 for performing communication with a mobile terminal 4, a location information management apparatus 3 for acquiring location information of the mobile terminal 4, and a processing apparatus 2 for changing operation states of the radio base station apparatus 1 based on the location information of the mobile terminal 4 acquired by the location information management apparatus 3. While the processing apparatus 2 is separately provided in FIG. 1, it may be included in the radio base station apparatus 1 or in the location information management apparatus 3.

The radio base station apparatus 1 is an apparatus that communicates with the mobile terminal 4. The radio base station apparatus 1 has functions of performing radio communication with the mobile terminal 4 and of capable of changing settings of itself according to instructions by a higher-order apparatus.

The processing apparatus 2 acquires information to switch operation states of the radio base station apparatus 1 from the location information management apparatus 3. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the location information management apparatus 3, to hold necessary information.

The location information management apparatus 3 is an apparatus for holding information that can specify the location of the mobile terminal 4. The location information management apparatus 3 receives data related to the location information from the mobile terminal 4 at fixed intervals, or upon receiving a location registration request/location update request from the mobile terminal 4. The location information management apparatus 3 further has a function of storing the data in a form that can be passed to the processing apparatus 2.

Next, an operation of the mobile communication system according to the first exemplary embodiment will be described.

When the location information of the mobile terminal 4 is changed, the mobile terminal 4 notifies the location information management apparatus 3 of the change in the location information of the mobile terminal 4. Upon receiving this, the location information management apparatus 3 updates the stored location information to the latest information.

The processing apparatus 2 requests data from the location information management apparatus 3 to receive the location information of the mobile terminal 4. Then the processing apparatus 2 sets the operation state of the radio base station apparatus 1 based on this location information. Now, setting of the operation state includes turning off a power supply of the radio base station 1, turning on the power supply, setting a state in which radio waves are not emitted (regardless of whether the power supply is ON or OFF), adjusting the intensity, type, cycle and the like of radio waves that are emitted.

Further, the type of radio waves includes a pilot signal (e.g., signal transmitted by CPICH), a broadcast signal, a communication signal used to communicate with a mobile terminal (mobile station), and other radio signals. Furthermore, each of these signals includes a plurality of kinds of signals. For example, the broadcast signal includes a first broadcast signal transmitted by a primary common control physical channel (P-CCPCH) and a second broadcast signal transmitted by a secondary common control physical channel (S-CCPCH). Further, "changing the type of radio waves" includes changing the pilot signal to the communication signal or changing the first broadcast signal to the second broadcast signal, for example.

When the mobile terminal 4 is in a service area 5 of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is in the service area 5 of the radio base station apparatus 1. In this case, the processing apparatus 2 keeps the state in which radio waves are emitted from the radio base station apparatus 1 to allow the mobile terminal 4 to communicate with the radio base station apparatus 1.

On the other hand, when the mobile terminal 4 is not within the service area 5 of the radio base station apparatus 1, the location information management apparatus 3 acquires, as the location information of the mobile terminal 4, the location information that the mobile terminal 4 is not within the service area 5 of the radio base station apparatus 1. Then, the processing apparatus 2 requests data from the location information management apparatus 3, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

Described next is a case in which the mobile terminal 4 falls within the service area 5 of the radio base station apparatus 1 from outside the service area 5. In this case, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is within the service area 5 of the radio base station apparatus 1. In this case, the processing apparatus 2 allows radio waves to emit from the radio base station apparatus 1 to allow the mobile terminal 4 to communicate with the radio base station apparatus 1. If the power supply is OFF, the power supply of the radio base station apparatus may be turned on using a method like Wake-on-LAN.

In this way, power consumption of the mobile communication system may be efficiently reduced by changing the operation state of the radio base station apparatus 1 based on the location information of the mobile terminal 4, i.e., by setting a state in which radio waves are not emitted from the radio base station apparatus 1, or by changing at least one of intensity, type, and cycle of radio waves emitted from the radio base station apparatus. Further, it is possible to prevent wasted radio waves from being emitted when there is no mobile terminal 4 in the range of the radio base station apparatus 1, thereby being capable of reducing interference with a neighborhood.

Next, a control method of the mobile communication system according to the first exemplary embodiment will be described in detail.

The control method of the mobile communication system according to the first exemplary embodiment includes steps of acquiring location information of the mobile terminal 4 which performs communication with the radio base station apparatus 1, and changing the operation state based on the location information of the mobile terminal 4 by setting the radio base station apparatus 1 performing communication with the mobile terminal 4 in such a manner that the radio base station apparatus 1 does not emit radio waves or by changing at least one of intensity, type, and cycle of radio waves emitted from the radio base station apparatus.

Here, the operation state may be changed to turn off the power supply of the radio base station apparatus 1. Further, the operation state may be changed so that the radio base station apparatus 1 emits radio waves when the mobile terminal moves into the service area 5 of the radio base station apparatus 1 from outside the service area 5.

According to the control method of the mobile communication system according to the first exemplary embodiment, it is possible to provide the control method of the mobile communication system that is capable of efficiently reducing power consumption of the radio base station apparatus 1.

Second Exemplary Embodiment

Figure 2:
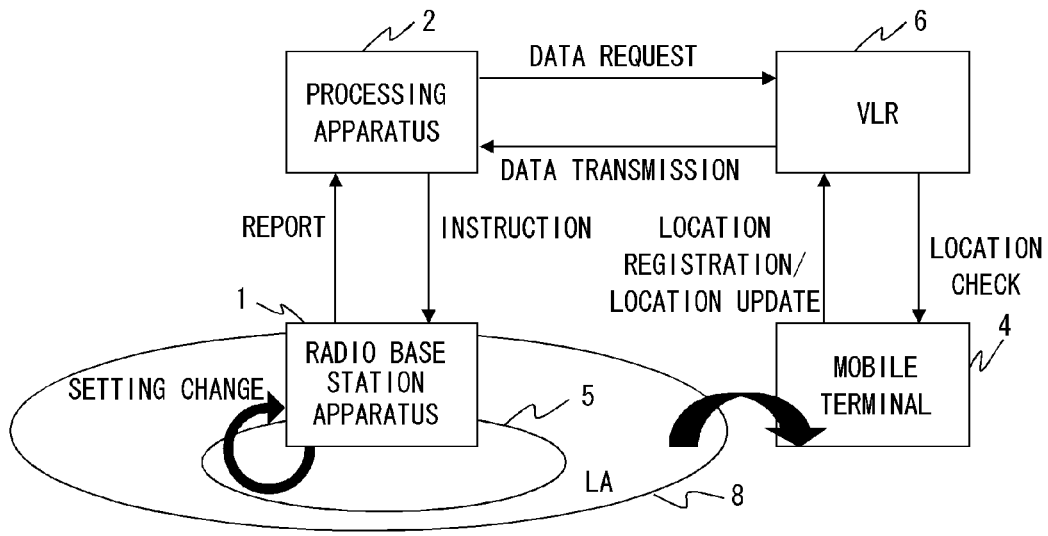
FIG. 2 is a block diagram for describing a mobile communication system according to a second exemplary embodiment.

Next, with reference to FIG. 2, a second exemplary embodiment of the present invention will be described. Note that the same components as those in the first exemplary embodiment shown in FIG. 1 are denoted by the same reference symbols. In the second exemplary embodiment, a visitor location register (VLR) 6 is used instead of the location information management apparatus 3 according to the first exemplary embodiment.

Specifically, a mobile communication system according to the second exemplary embodiment includes a radio base station apparatus 1 a processing apparatus 2, and the VLR 6. While the processing apparatus 2 is separately provided in FIG. 2, it may be included in the radio base station apparatus 1.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-order apparatus.

The VLR 6 is an apparatus which exists in a core network (CN). The VLR 6 is a kind of location register which is a database temporarily storing location information of the mobile terminal 4, and is located between a home location register (HLR) and the mobile terminal 4. The VLR 6 is able to store the information of the mobile terminal 4 which has accessed the HLR once. Accordingly, the mobile terminal 4 need not access the HLR every time it accesses the network, thereby capable of reducing a frequency to access the HLR.

The processing apparatus 2 acquires information to switch the operation state of the radio base station apparatus 1 from the VLR 6. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the VLR 6, to hold necessary information.

Next, an operation of the mobile communication system according to the second exemplary embodiment will be described. When the location information of the mobile terminal 4 is changed, the mobile terminal 4 notifies the VLR 6 of the change in the location information of the mobile terminal 4. Upon receiving this, the VLR 6 updates the stored location information to the latest information.

When the mobile terminal 4 moves and enters a different LA 8 beyond the boundary of a location area (LA) 8 formed of a plurality of cells, as specified in 3GPP TS24.008, the mobile terminal 4 transmits a location registration request (LOCATION UPDATING REQUEST) to the VLR 6, and the update of the location registration information is executed between the VLR 6 and the HLR. Then, when the update of the location registration information is executed, the VLR 6 transmits a location registration response (LOCATION UPDATING ACCEPT) to the mobile terminal 4.

The processing apparatus 2 requests data from the VLR 6 to receive the location information of the mobile terminal 4. The processing apparatus 2 then sets the operation state of the radio base station apparatus 1 based on this location information. Here, setting of the operation state includes turning off a power supply of the radio base station 1, turning on the power supply, setting a state in which radio waves are not emitted (regardless of whether the power supply is ON or OFF), adjusting the intensity, type, cycle and the like of radio waves that are emitted.

Regarding the setting of the operation state, a message is notified to the radio base station apparatus 1 through a radio access network application part (RANAP) protocol when the processing apparatus 2 exists in the CN and through a Home NodeB Application Part (HNBAP) protocol when the processing apparatus 2 is a Home NodeB Gateway (HNB-GW), and necessary processing is carried out.

When the mobile terminal 4 is within the LA 8, the VLR 6 acquires, as the location information of the mobile terminal 4, the location information that the mobile terminal 4 is within the LA 8. Then, the processing apparatus 2 requests data from the VLR 6, to thereby acquire the location information that the mobile terminal 4 is in the LA 8. When the mobile terminal 4 is outside a service area 5, the processing apparatus 2 sets the operation state in which radio waves are not emitted although the power supply of the radio base station apparatus 1 is ON, the intensity of radio waves that are emitted is decreased, the cycle for emission is elongated. When the mobile terminal 4 is within the service area 5, it is set in such a manner that radio waves are emitted in the similar way as the case of normal operation.

On the other hand, when the mobile terminal 4 is not within the LA 8, the VLR 6 acquires, as the location information of the mobile terminal 4, the location information that the mobile terminal 4 is not within the LA 8. Then, the processing apparatus 2 requests data from the VLR 6, to thereby acquire the location information that the mobile terminal 4 is outside the LA 8. In this case, the processing apparatus 2 turns off a power supply of the radio base station apparatus 1.

Further, when the mobile terminal 4 falls within the area of the LA 8 from outside the range of the LA 8, the VLR 6 acquires, as the location information of the mobile terminal 4, the location information that the mobile terminal 4 is within the LA 8. Then, the processing apparatus 2 requests data from the VLR 6, to thereby acquire the location information that the mobile terminal 4 is within the LA 8. In this case, the processing apparatus 2 sets intensity, type, cycle and the like of radio waves minimally necessary to continue communication without any problem when the mobile terminal 4 enters the service area 5 to address with the situation in which the mobile terminal 4 enters the service area 5, to allow radio waves to emit from the radio base station apparatus 1.

In this way, in the mobile communication system according to the second exemplary embodiment, power consumption of the mobile communication system may be efficiently reduced by changing the operation state of the radio base station apparatus 1 based on the location information of the mobile terminal 4, i.e., by setting a state in which radio waves are not emitted from the radio base station apparatus 1, or by changing at least one of intensity, type, and cycle of radio waves emitted from the radio base station apparatus. Further, it is possible to prevent wasted radio waves from being emitted when there is no mobile terminal 4 in the range of the radio base station apparatus 1, thereby being capable of reducing interference with a neighborhood.

Figure 3:
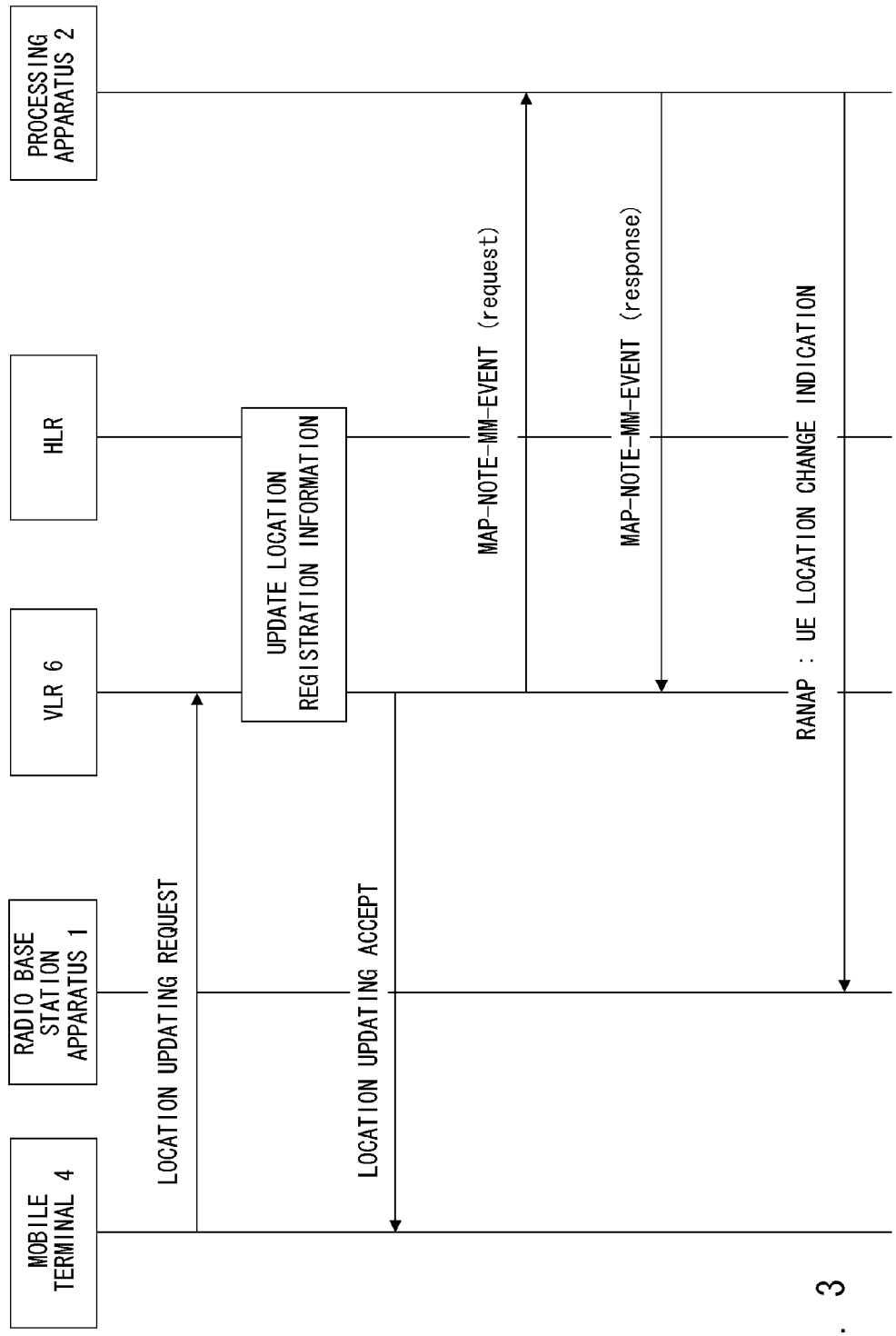
FIG. 3 is a diagram for describing an operation of the mobile communication system according to the second exemplary embodiment.

Next, with reference to FIG. 3, an operation of the mobile communication system when the processing apparatus 2 according to the second exemplary embodiment is in the CN will be described. As shown in FIG. 3, when the mobile terminal 4 moves from the area of the LA 8 to outside the area of the LA 8, the mobile terminal 4 sends a location registration request (LOCATION UPDATING REQUEST) to the VLR 6. When the update of the location registration information is ended between the VLR 6 and the HLR, the VLR 6 sends back a location registration response (LOCATION UPDATING ACCEPT) to the mobile terminal 4. According to this operation, it is regarded that the mobile terminal 4 is outside the range of the LA 8.

Upon completion of this operation, when the VLR 6 transmits "MAP-NOTE-MM-EVENT (request)" to the processing apparatus 2 via a mobile application part (MAP), the processing apparatus 2 sends back "MAP-NOTE-MM-EVENT (response)" as a response to the request. Further, upon receiving "MAP-NOTE-MM-EVENT (request)" from the VLR 6, the processing apparatus 2 determines the parameter value of "OPERATIONAL STATE CHANGE" which is the message of RANAP in FIG. 4 newly added to 3GPP TS25.413, and notifies the radio base station apparatus 1 of this parameter value to set the operation state.

In the parameters shown in FIG. 4, three kinds of operation states may be set. Specifically, "Power On" shown in FIG. 4 indicates turning on the power supply of the radio base station apparatus, "Power Off" indicates turning off the power supply of the radio base station apparatus, "radio field intensity" of "Save Mode" indicates the intensity of radio waves that are emitted, "sort of signals" indicates the kind of signal to be emitted, and "period" indicates setting of the cycle for emitting radio waves. By setting these parameters, the operation state of the radio base station apparatus 1 may be changed.

Figure 5:
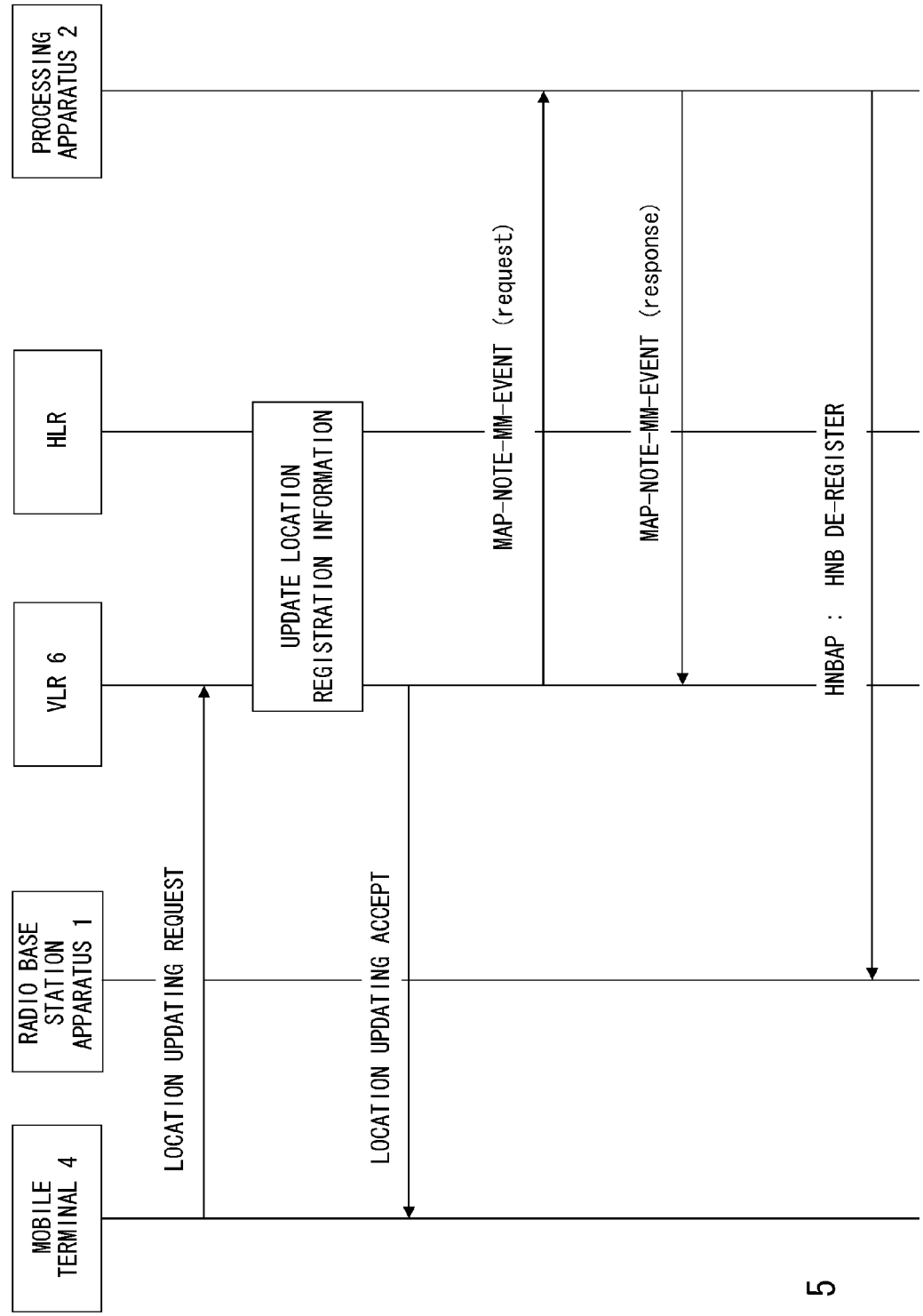
FIG. 5 is a diagram for describing the operation of the mobile communication system according to the second exemplary embodiment.

Next, an operation of the mobile communication system when the processing apparatus 2 is HNB-GW will be described. There are two execution means to take when the processing apparatus 2 is HNB-GW. FIG. 5 is a diagram for describing the first operation of the mobile communication system. When the mobile terminal 4 moves from the area of the LA 8 to outside the area of the LA 8, as shown in FIG. 5, the mobile terminal 4 sends a location registration request (LOCATION UPDATING REQUEST) to the VLR 6. Then, when the update of the location registration information is ended between the VLR 6 and the HLR, the VLR 6 sends back a location registration response (LOCATION UPDATING ACCEPT) to the mobile terminal 4. According to this operation, it is regarded that the mobile terminal 4 is outside the range of the LA 8.

Upon completion of this operation, when the VLR 6 transmits "MAP-NOTE-MM-EVENT (request)" to the processing apparatus 2 via a MAP, the processing apparatus 2 sends back "MAP-NOTE-MM-EVENT (response)" in response to the request. Upon receiving "MAP-NOTE-MM-EVENT (request)" from the VLR 6, the processing apparatus 2 determines the parameter value of "HNB DE-REGISTER" which is the message of HNBAP shown in FIG. 6, and notifies the radio base station apparatus 1 of this parameter value to set the operation state.

Although HNBAP is noted in 3GPP TS25.469, as shown in FIG. 6, by adding the parameter of "Power Off" (underline), the power supply of the radio base station apparatus 1 may be turned off using "HNB DE-REGISTER" which is the message of HNBAP.

Figure 7:
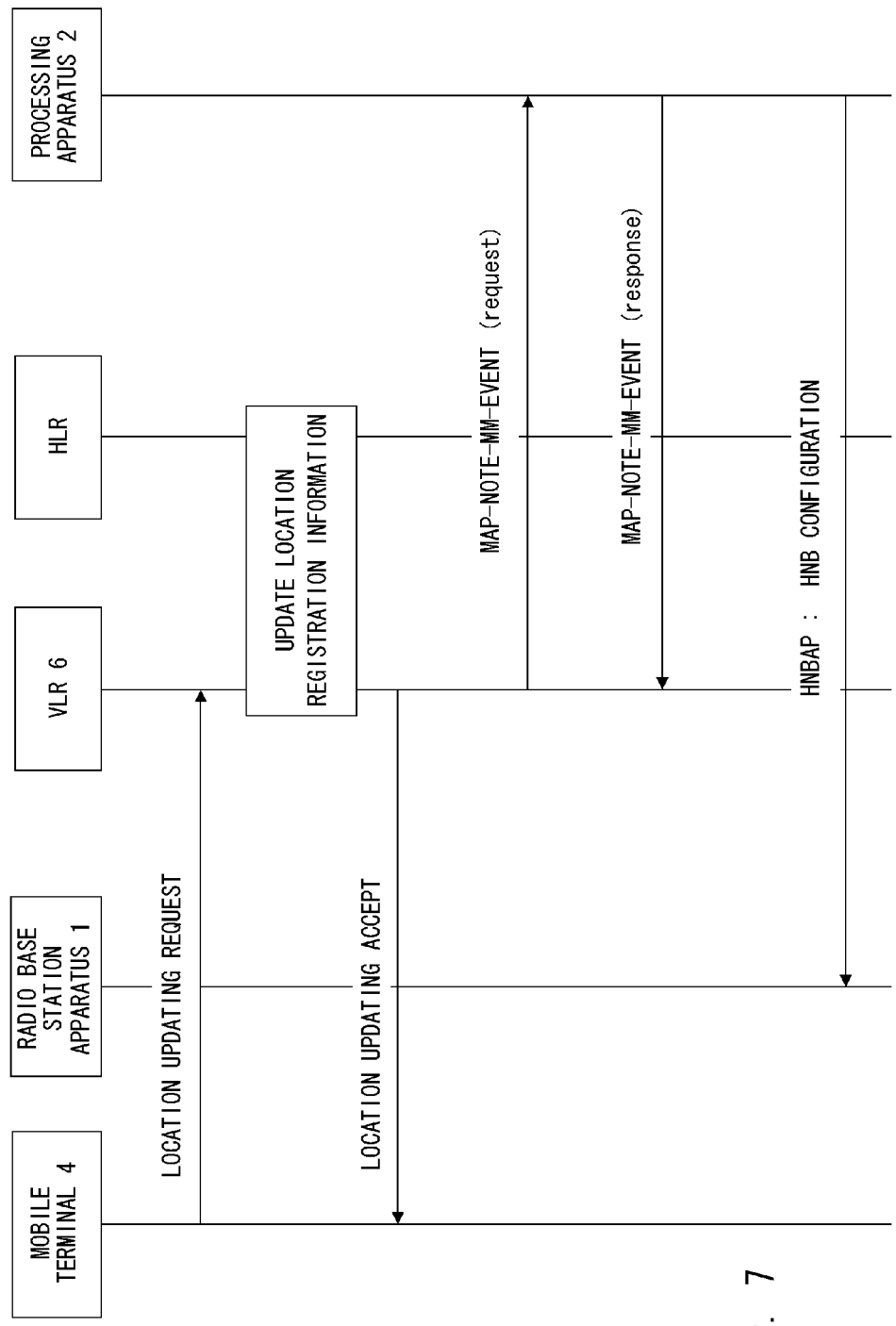
FIG. 7 is a diagram for describing the operation of the mobile communication system according to the second exemplary embodiment.

Next, with reference to FIG. 7, the second execution means when the processing apparatus 2 is HNB-GW will be described. As shown in FIG. 7, when the mobile terminal 4 moves from the area of the LA 8 to outside the area of the LA 8, the mobile terminal 4 sends a location registration request (LOCATION UPDATING REQUEST) to the VLR 6. Then, when the update of the location registration information is ended between the VLR 6 and the HLR, the VLR 6 sends back a location registration response (LOCATION UPDATING ACCEPT) to the mobile terminal 4. According to this operation, it is regarded that the mobile terminal 4 is outside the range of the LA 8.

Upon completion of this operation, when the VLR 6 transmits "MAP-NOTE-MM-EVENT (request)" to the processing apparatus 2 via a MAP, the processing apparatus 2 sends back "MAP-NOTE-MM-EVENT (response)" as a response to the request. Upon receiving "MAP-NOTE-MM-EVENT (request)" from the VLR 6, the processing apparatus 2 determines a parameter value of "HNB CONFIGURATION" which is the message of HNBAP shown in FIG. 8, and notifies the radio base station apparatus 1 of this parameter value, thereby being able to set the operation state.

At this time, by adding a new message of "HNB CONFIGURATION" shown in FIG. 8 to 3GPP TS25.469, it is possible to turn on/off the power supply, and to operate a save mode. The parameters shown in FIG. 8 are the same to those shown in FIG. 4.

In the second exemplary embodiment, the VLR 6 transmits information to the processing apparatus 2 upon change in the location information. However, the processing apparatus 2 may request information from the VLR 6, and the VLR 6 may send back the information in response to the request.

Further, while described above is the case in which the processing apparatus 2 changes the operation state of the radio base station apparatus 1, the radio base station apparatus 1 may autonomously change the operation state. In this case, there are two methods to take as stated below.

First, according to the first method, when the processing apparatus 2 exists in the CN, "UE EXISTENCE INDICATION" shown in FIG. 9 is added to RANAP. Further, when the processing apparatus 2 is HNB-GW, "UE EXISTENCE INDICATION" shown in FIG. 10 is added to HNBAP.

The messages shown in FIGS. 9 and 10 are to transmit the number of user equipment (UE) which exist inside a certain LA or a routing area (RA) to the radio base station apparatus 1 using parameters of "PLMN Identity", "LAC" or "RAC", "Number of UE". The radio base station apparatus 1 is able to know the number of UE that exist in the LA 8 or the RA to which it belongs by "Number of UE" by receiving these parameter values from the CN and the HNB-GW, thereby being capable of autonomously changing the operation state according to the number of UE.

Further, according to the second method, when the processing apparatus 2 exists in the CN, "INQUIRE UE EXISTENCE" shown in FIG. 11 is added to RANAP. Further, when the processing apparatus 2 is HNB-GW, "INQUIRE UE EXISTENCE" shown in FIG. 12 is added to HNBAP.

The messages shown in FIGS. 11 and 12 are messages in which the radio base station apparatus 1 requests the number of UE which exist inside the LA or RA from the CN or HNB-GW. The radio base station apparatus 1 notifies the CN or the HNB-GW of "PLMN Identity", "LAC" or "RAC". Upon receiving the notification, the CN or the HNB-GW notifies the radio base station apparatus 1 of the number of UE using the parameter of "UE EXISTENCE INDICATION" which is the message shown in FIGS. 9 and 10. Upon receiving "UE EXISTENCE INDICATION" from the CN or the HNB-GW, the radio base station apparatus 1 autonomously changes the operation state according to the number of UE.

In the second exemplary embodiment, it is assumed that the LAC or the RAC to which the radio base station apparatus 1 belongs is specified. However, the information may be acquired by specifying another LAC or RAC to predict the moving tendency of the mobile terminal 4 using this information, for example.

Note that, in the radio communication system of a long term evolution (LTE), the VLR 6 according to the second exemplary embodiment is replaced with a home subscriber server (HSS) and the LA 8 is replaced with a tracking area (TA). Further, as described in the messages shown in FIGS. 18 and 19, the radio base station apparatus 1 specifies the TA by "PLMN Identity" and "TAC" via the protocol S1AP used in the LTE, and the number of UE "Number of UE" which exists inside the TA can be notified from the higher-order apparatus or requested to the higher-order apparatus.

Third Exemplary Embodiment

Figure 13:
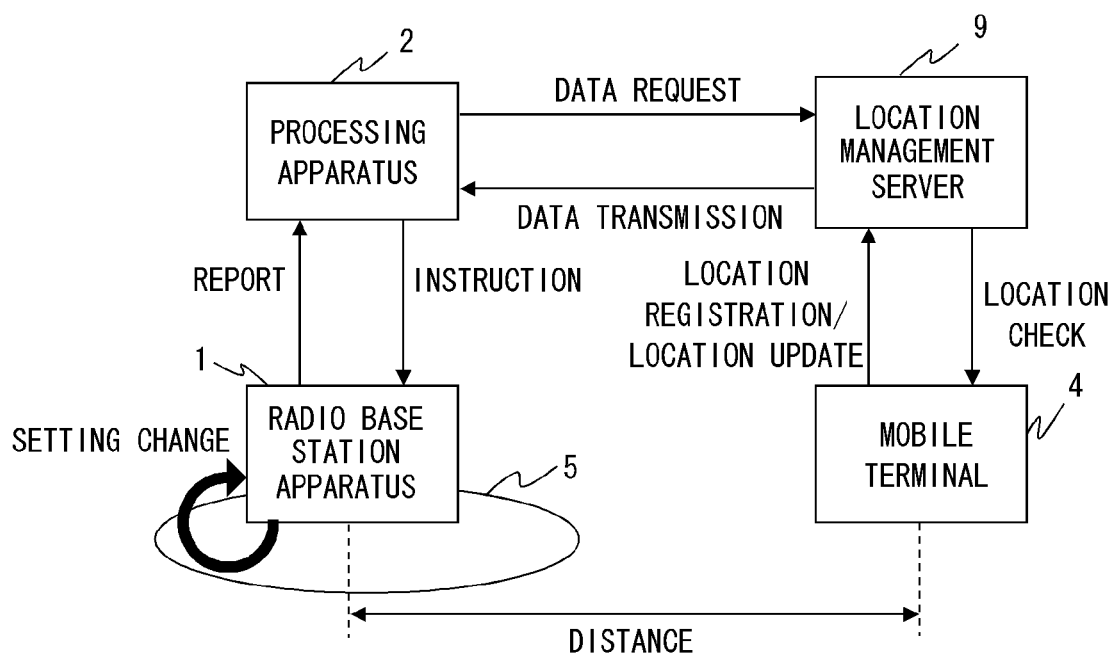
FIG. 13 is a block diagram for describing a mobile communication system according to a third exemplary embodiment.

Next, with reference to FIG. 13, a third exemplary embodiment of the present invention will be described. Note that the same components as those shown in the first exemplary embodiment shown in FIG. 1 are denoted by the same reference symbols. In the third exemplary embodiment, a location management server 9 is used instead of the location information management apparatus 3 according to the first exemplary embodiment.

Specifically, a mobile communication system according to the third exemplary embodiment includes a radio base station apparatus 1, a processing apparatus 2, and the location management server 9. While the processing apparatus 2 is separately provided in FIG. 13, it may be included in the radio base station apparatus 1.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-order apparatus.

The location management server 9 is an apparatus capable of storing positioning information of the mobile terminal 4 obtained from a GPS, for example. The location management server 9 updates the positioning information of the mobile terminal 4 obtained from the GPS at regular intervals from the mobile terminal 4 or upon receiving a location registration request/location update request from the mobile terminal 4.

The processing apparatus 2 acquires information to switch the operation state of the radio base station apparatus 1 from the location management server 9. The processing apparatus 2 is connected to a plurality of radio base station apparatuses, and sets the operation state of each radio base station apparatus 1 according to the changes of the location information of the mobile terminal 4. In order to achieve this function, the processing apparatus 2 has a function of exchanging information with the radio base station apparatus 1 and the location management server 9, to hold necessary information.

Next, an operation of the mobile communication system according to the third exemplary embodiment will be described.

When the location information of the mobile terminal 4 is changed, the mobile terminal 4 notifies the location management server 9 of the change in the location information of the mobile terminal 4. Upon receiving this, the location management server 9 updates the stored location information to latest information.

The processing apparatus 2 requests data from the location management server 9 to receive the location information of the mobile terminal 4. Then, the processing apparatus 2 sets the operation state of the radio base station apparatus 1 based on this location information. Now, setting of the operation state includes turning off a power supply of the radio base station 1, turning on the power supply, setting a state in which radio waves are not emitted (regardless of whether the power supply is ON or OFF), adjusting the intensity, type, and cycle of radio waves that are emitted, and the like.

When the distance between the mobile terminal 4 and the radio base station apparatus 1 is within the range of a service area 5 of the radio base station apparatus 1, the location management server 9 acquires, as the location information of the mobile terminal 4, the location information that the mobile terminal 4 is within the service area 5 of the radio base station apparatus 1. Then, the processing apparatus 2 requests data from the location management server 9, to thereby acquire the location information that the mobile terminal 4 is within the service area 5 of the radio base station apparatus 1. In this case, the processing apparatus 2 keeps the state in which radio waves are emitted from the radio base station apparatus 1 so as to allow the mobile terminal 4 to communicate with the radio base station apparatus 1.

On the other hand, when the distance between the mobile terminal 4 and the radio base station apparatus 1 is away from the range of the service area 5 of the radio base station apparatus 1, the location management server 9 acquires, as the location information of the mobile terminal 4, the location information that the mobile terminal 4 is not within the service area 5 of the radio base station apparatus 1. Then, the processing apparatus 2 requests data from the location management server 9, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

Further, when the distance between the mobile terminal 4 and the radio base station apparatus 1 falls within the service area 5 from the state in which this distance is away from the range of the service area 5 of the radio base station apparatus 1, the location management server 9 acquires, as the location information of the mobile terminal 4, the location information that the mobile terminal 4 is in the service area 5 of the radio base station apparatus 1. Then, the processing apparatus 2 requests data from the location management server 9, to thereby acquire the location information that the mobile terminal 4 is within the service area 5 of the radio base station apparatus 1. In this case, the processing apparatus 2 allows radio waves to emit from the radio base station apparatus 1 to allow the mobile terminal 4 to communicate with the radio base station apparatus 1.

In this way, power consumption of the mobile communication system may be efficiently reduced by changing the operation state of the radio base station apparatus 1 based on the location information of the mobile terminal 4, i.e., by setting a state in which radio waves are not emitted from the radio base station apparatus 1, or by changing at least one of intensity, type, and cycle of radio waves emitted from the radio base station apparatus. Further, it is possible to prevent wasted radio waves from being emitted when there is no mobile terminal 4 in the range of the radio base station apparatus 1, thereby being capable of reducing interference with a neighborhood.

Next, operations of the mobile communication system according to the third exemplary embodiment will be described with reference to FIGS. 14 and 15. First, in FIG. 14, the location management server 9 receives the positioning information registration request of the mobile terminal 4 obtained from the GPS and transmits the positioning information registration check request back to the mobile terminal 4. After that, when the location management server 9 transmits "MAP-NOTE-MM-EVENT (request)" via the MAP, "MAP-NOTE-MM-EVENT (response)" is sent back as a response to the request. Upon receiving this result, the processing apparatus 2 sets the operation state of the radio base station apparatus 1.

Figure 15:
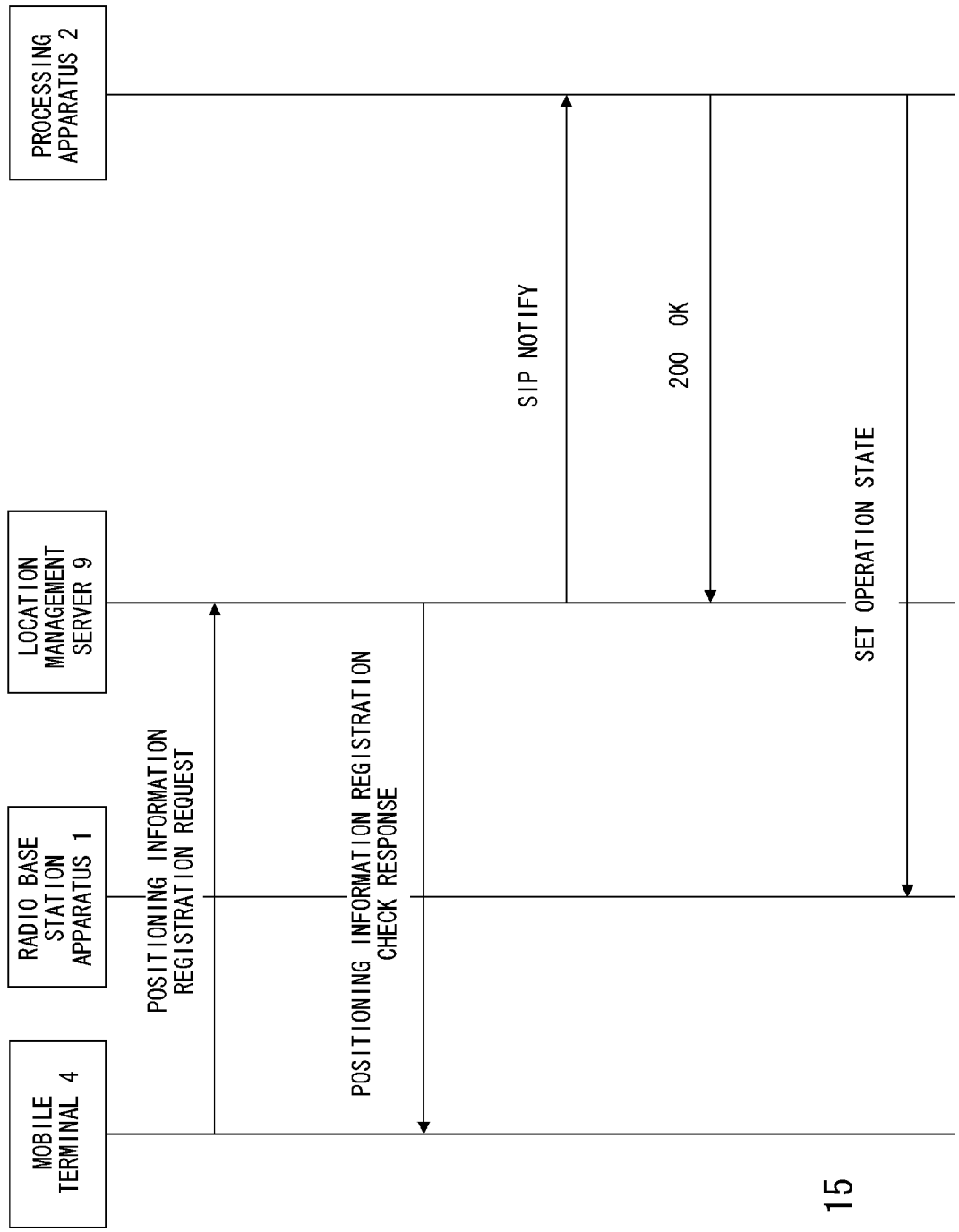
FIG. 15 is a diagram for describing the operation of the mobile communication system according to the third exemplary embodiment.

Further, in FIG. 15, the location management server 9 receives the positioning information registration request of the mobile terminal 4 obtained from the GPS to transmit back the positioning information registration check response to the mobile terminal 4. Then, information is exchanged between the location management server 9 and the processing apparatus 2 via a session initiation protocol (SIP). The processing apparatus 2 requests notification of the presence information from the location information server 9 by "SIP SUBSCRIBE" in advance, and the location management server 9 sends back presence information by "SIP NOTIFY". Upon receiving this result, the processing apparatus 2 sets the operation state of the radio base station apparatus 1.

Figure 14:
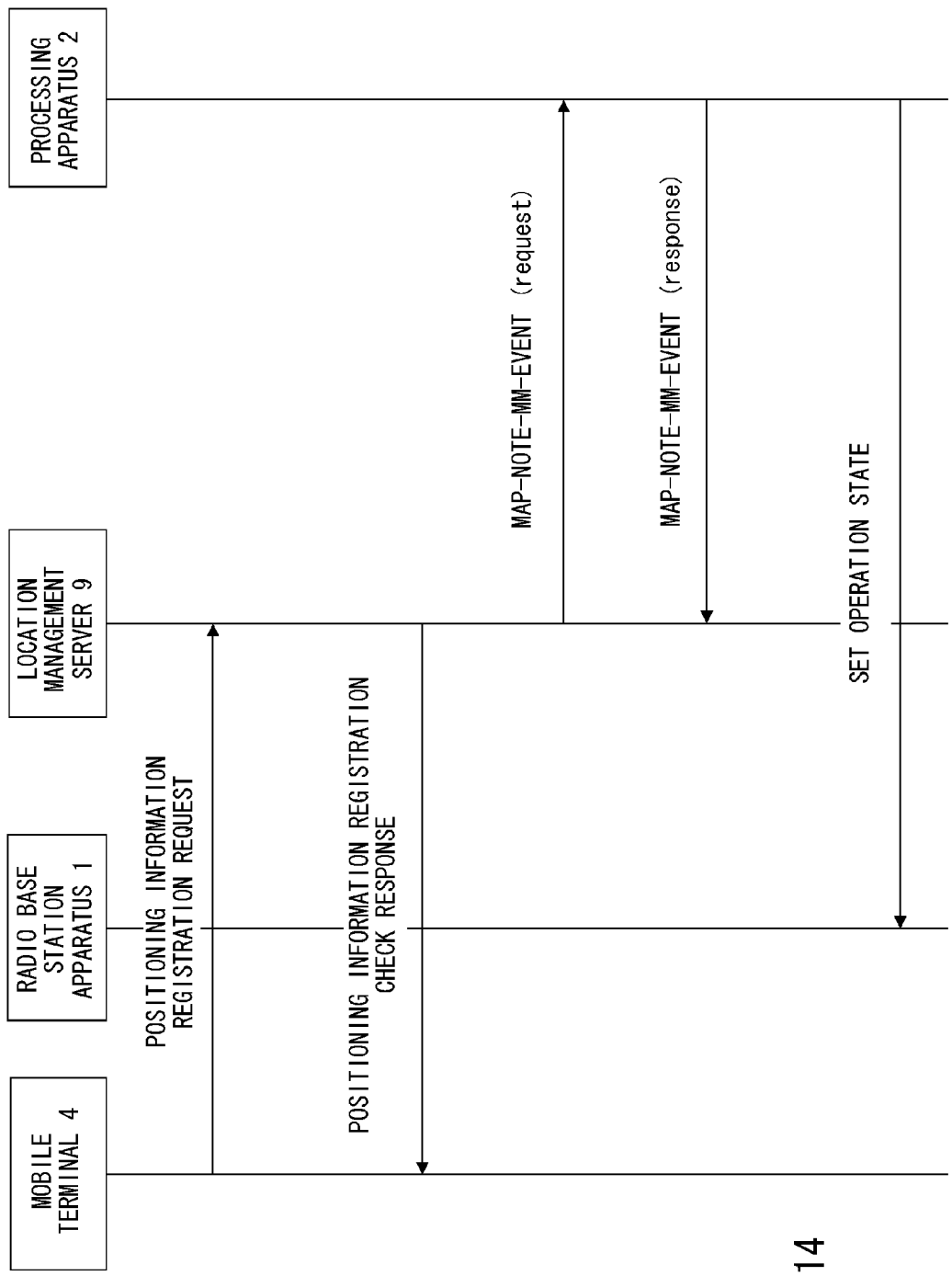
FIG. 14 is a diagram for describing an operation of the mobile communication system according to the third exemplary embodiment.
Figure 16:
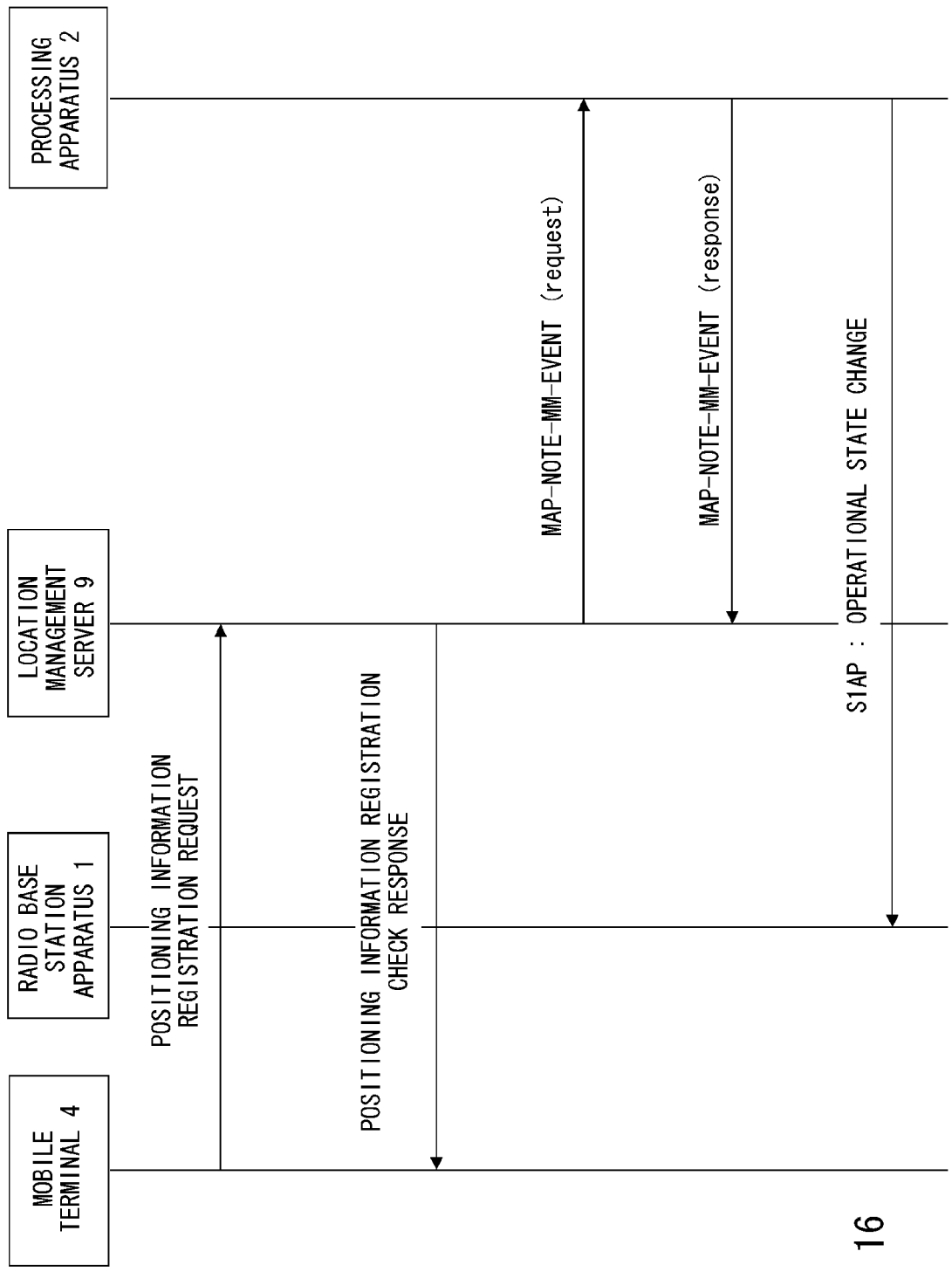
FIG. 16 is a diagram for describing the operation of the mobile communication system according to the third exemplary embodiment.

In the operations of the mobile communication system shown in FIGS. 14 and 15, setting of the operation state executed by the processing apparatus 2 to the radio base station apparatus 1 may be, as described in the second exemplary embodiment, executed via RANAP and HNBAP. Further, when the processing apparatus 2 is a mobility management entity (MME), the setting may be executed via S1AP. FIG. 16 is a diagram showing an operation of the mobile communication system when the processing apparatus 2 is the MME. As shown in FIG. 16, the location management server 9 receives the positioning information registration request of the mobile terminal 4 obtained from the GPS to transmit back the positioning information registration check request to the mobile terminal 4. After that, when the location management server 9 transmits "MAP-NOTE-MM-EVENT (request)" via the MAP, "MAP-NOTE-MM-EVENT (response)" is sent back as a response to the request. Upon receiving this result, the processing apparatus 2 sets the operation state of the radio base station apparatus 1 via S1AP. In this case, by adding a new message of "OPERATIONAL STATE CHANGE" shown in FIG. 17 to 3GPP TS36.413, it is possible to turn on/off a power supply, and to perform the operation of the save mode. Note that each parameter shown in FIG. 17 is similar to those shown in FIG. 4.

In this exemplary embodiment, the location management server 9 transmits the information to the processing apparatus 2 upon change in the distance between the mobile terminal 4 and the radio base station apparatus 1. However, such a configuration may be possible in which the processing apparatus 2 requests information from the location management server 9 and the location management server 9 sends back the information in response to the request.

Further, in the second exemplary embodiment, two methods of autonomously changing the operation state by the radio base station apparatus 1 via RANAP and two methods of autonomously changing the operation state by the radio base station apparatus 1 via HNBAP have been described (see FIGS. 9 to 12). In the third exemplary embodiment, there are two cases as follows of autonomously changing the operation state by the radio base station apparatus 1 (via S1AP).

The first case is to add "UE EXISTENCE INDICATION" shown in FIG. 18 to S1AP (in this case, the processing apparatus is MME). The message shown in FIG. 18 is to repeat detection of the number of UE (Number of UE) that exist inside the circles having different radii each time for the number of times set by "MaxnoofUEsperradius" with points of latitude, longitude, and altitude as a center, and to transmit the result to the radio base station apparatus 1 (eNB/HeNB). Then, the radio base station apparatus 1 that receives the message as shown in FIG. 18 from the MME autonomously changes the operation state according to the number of UE.

Now, a procedure is required for converting location information of each UE inside the circle having a certain radius with the location specified by the radio base station apparatus 1 as a center to the number of UE inside the circle. The apparatus executing this procedure may be such an apparatus like a Gateway Mobile Location Center (GMLC) described in 3GPP TS23.002, for example.

The second case is to add "INQUIRE UE EXISTENCE" shown in FIG. 19 to S1AP (in this case as well, the processing apparatus is the MME). The message shown in FIG. 19 is a message in which the radio base station apparatus 1 (eNB/HeNB) notifies the MME of the type of radius of the circle where the number of UE is required to be obtained by "radius". Upon receiving this message, the MME notifies the radio base station apparatus 1 of the parameter value of "UE EXISTENCE INDICATION" which is the message shown in FIG. 18. Then, the radio base station apparatus 1 that receives "UE EXISTENCE INDICATION" from the MME autonomously changes the operation state according to the number of UE.

In the third exemplary embodiment, it is assumed that the location of the radio base station apparatus 1 is specified as "center" of "Geographical location". However, other points may be specified as "center". In this case, the moving tendency of the mobile terminal may be predicted for example by using information of other points.

Although the parameter "Geographical location" described in FIGS. 9 to 12 is not used in the second exemplary embodiment, when the operation state is changed via RANAP or HNBAP in the third exemplary embodiment, this parameter "Geographical location" is used. In this case as well, this parameter is used in a case of repeating detection of the number of UE (Number of UE) that exist inside the circle having different radii each time for the number of times set by "MaxnoofUEsperradius" with points of latitude, longitude, and altitude as a center and notifying the radio base station apparatus 1 of the results by the CN and HNB-GW, and a case in which the radio base station apparatus 1 requests the results from the CN or HNB-GW.

Fourth Exemplary Embodiment

Figure 20:
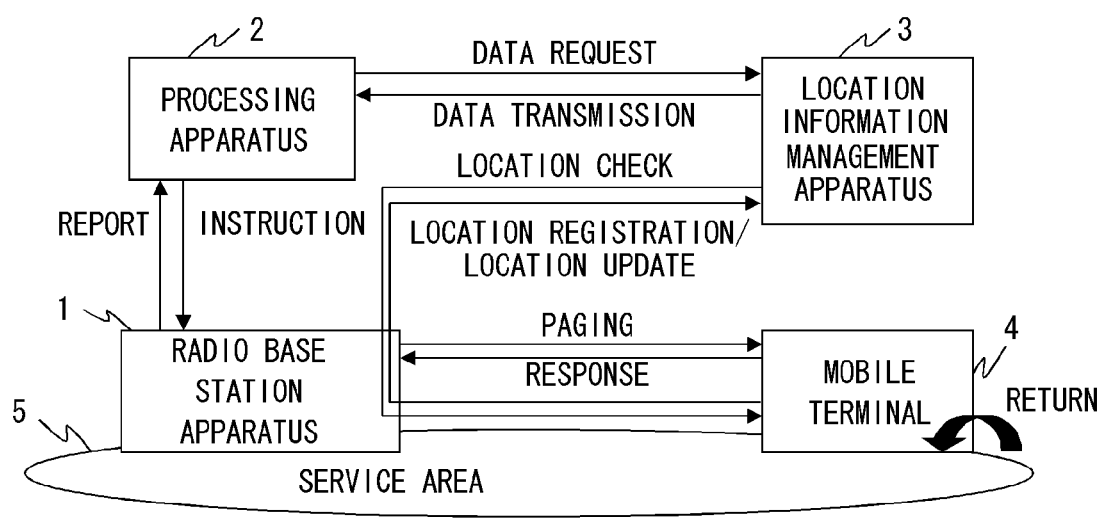
FIG. 20 is a block diagram for describing a mobile communication system according to a fourth exemplary embodiment.

Next, with reference to FIG. 20, a fourth exemplary embodiment of the present invention will be described. Note that the same components as those in the first exemplary embodiment shown in FIG. 1 are denoted by the same reference symbols. The fourth exemplary embodiment is different from the first exemplary embodiment in that periodic paging is performed by a radio base station apparatus 1.

Specifically, a mobile communication system according to the fourth exemplary embodiment includes the radio base station apparatus 1, a processing apparatus 2, and a location information management apparatus 3. Although the processing apparatus 2 is separately provided in FIG. 20, it may be included in the radio base station apparatus 1 or in the location information management apparatus 3.

The radio base station apparatus 1 is an apparatus that communicates with a mobile terminal 4. The radio base station apparatus 1 has functions of performing radio communication with the mobile terminal 4 and of capable of changing settings of itself according to instructions by a higher-order apparatus.

The processing apparatus 2 acquires the information to switch the operation state of the radio base station apparatus 1 from the location information management apparatus 3. The processing apparatus 2 is connected to a plurality of radio base station apparatuses, and sets the operation state of each radio base station apparatus 1 according to the changes in the location information of the mobile terminal 4. To achieve this function, the processing apparatus 2 has a function of exchanging information with the radio base station apparatus 1 and the location information management apparatus 3, to hold necessary information.

The location information management apparatus 3 is an apparatus for holding information with which the location of the mobile terminal 4 can be specified. In the fourth exemplary embodiment, the radio base station apparatus 1 autonomously executes periodic paging to check the presence or absence of the mobile terminal 4. Upon acquiring the location information of the mobile terminal 4, the radio base station apparatus 1 holds the location information in the location information management apparatus 3.

Next, an operation of the mobile communication system according to the fourth exemplary embodiment will be described.

When the location information of the mobile terminal 4 is changed, the mobile terminal 4 notifies the location information management apparatus 3 of the change in the location information of the mobile terminal 4. Upon receiving this notification, the location information management apparatus 3 updates the stored location information to the latest information.

The processing apparatus 2 requests data from the location information management apparatus 3 to receive the location information of the mobile terminal 4. Then, the processing apparatus 2 sets the operation state of the radio base station apparatus 1 based on this location information. Here, setting of the operation state includes turning off a power supply of the radio base station 1, turning on the power supply, setting a state in which radio waves are not emitted (regardless of whether the power supply is ON or OFF), adjusting the intensity, type, cycle and the like of radio waves that are emitted.

When the mobile terminal 4 is within a service area 5 of the radio base station apparatus 1, i.e., when the mobile terminal 4 responds to the paging of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is within the service area 5 of the radio base station apparatus 1. In this case, the processing apparatus 2 keeps the state in which radio waves are emitted from the radio base station apparatus 1 so as to allow the mobile terminal 4 to communicate with the radio base station apparatus 1.

On the other hand, when the mobile terminal 4 is not within the service area 5 of the radio base station apparatus 1, i.e., when the mobile terminal 4 does not respond to the paging of the radio base station 1, the location information management apparatus 3 acquires, as the location information of the mobile terminal 4, the location information that the mobile terminal 4 is not within the service area 5 of the radio base station apparatus 1. Then, the processing apparatus 2 requests data from the location information management apparatus 3, to thereby acquire the location information that the mobile terminal 4 is outside the service area 5 of the radio base station apparatus 1. In this case, since the mobile terminal 4 need not communicate with the radio base station apparatus 1, the processing apparatus 2 stops radio waves emitted from the radio base station apparatus 1.

In the fourth exemplary embodiment, the location of the mobile terminal 4 is specified according to whether the mobile terminal 4 responds to the paging of the radio base station apparatus 1. Thus, the radio base station apparatus 1 repeats periodic paging at regular intervals even when the mobile terminal 4 is outside the service area 5.

Further, when the mobile terminal 4 moves into the service area 5 from the outside the range of the service area 5 of the radio base station apparatus 1, i.e., when the mobile terminal 4 returns to the service area 5 and responds to the periodic paging of the radio base station apparatus 1, the location information management apparatus 3 acquires, as the location information of the mobile terminal 4, the location information that the mobile terminal 4 is within the service area 5 of the radio base station apparatus 1. Then, the processing apparatus 2 requests data from the location information management apparatus 3, to thereby acquire the location information that the mobile terminal 4 is in the service area 5 of the radio base station apparatus 1. In this case, the processing apparatus 2 allows radio waves to emit from the radio base station apparatus 1 so as to allow the mobile terminal 4 to communicate with the radio base station apparatus 1.

In this way, power consumption of the mobile communication system may be efficiently reduced by changing the operation state of the radio base station apparatus 1 based on the location information of the mobile terminal 4, i.e., by setting a state in which radio waves are not emitted from the radio base station apparatus 1, or by changing at least one of intensity, type, and cycle of radio waves emitted from the radio base station apparatus. Further, it is possible to prevent wasted radio waves from being emitted when there is no mobile terminal 4 in the range of the radio base station apparatus 1, thereby being capable of reducing interference with a neighborhood.

Further, since the base station apparatus 1 uses the method of periodic paging according to the fourth exemplary embodiment, it is possible to check the presence or absence in the service area in a shorter period than periodic location registration by the mobile terminal.

Fifth Exemplary Embodiment

Figure 21:
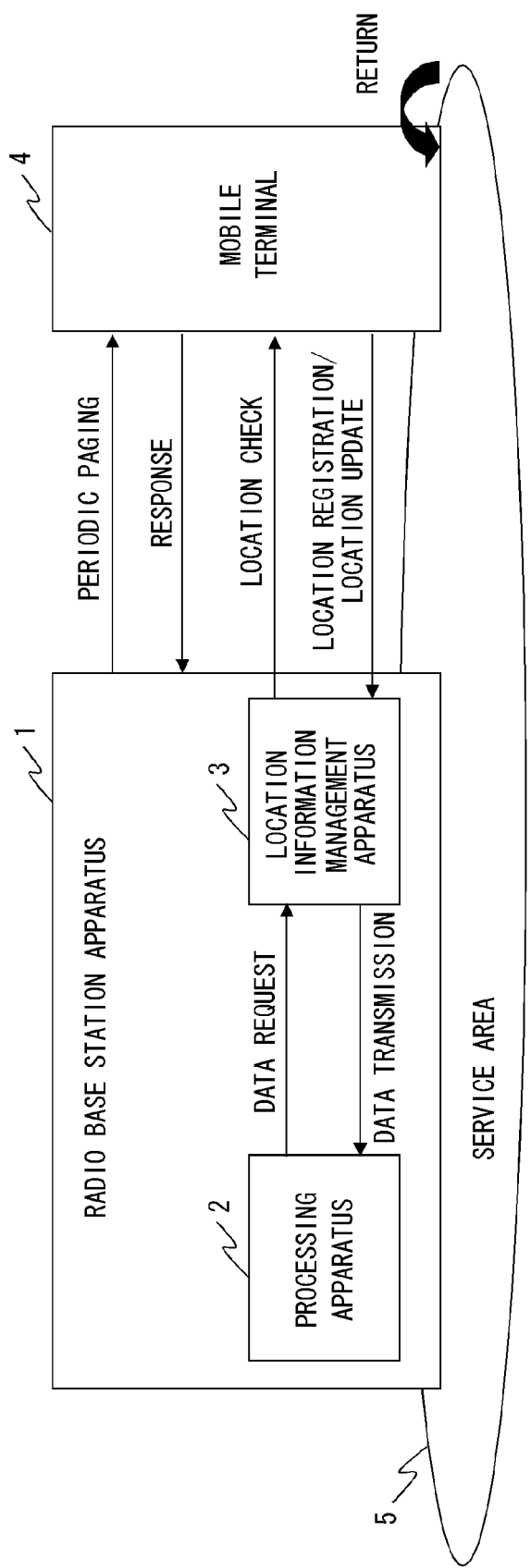
FIG. 21 is a block diagram for describing a mobile communication system according to a fifth exemplary embodiment.

Next, with reference to FIG. 21, a fifth exemplary embodiment of the present invention will be described. The same components as those in the fourth exemplary embodiment shown in FIG. 20 are denoted by the same reference symbols. The fifth exemplary embodiment is different from the fourth exemplary embodiment in that a radio base station apparatus 1 includes a processing apparatus 2 and a location information management apparatus 3.

Specifically, a mobile communication system according to the fifth exemplary embodiment includes the radio base station apparatus 1, the processing apparatus 2, and the location information management apparatus 3. The processing apparatus 2 and the location information management apparatus 3 are provided inside the radio base station apparatus 1.

Other parts are similar to those in the fourth exemplary embodiment; description thereof will be omitted.

Also in the invention according to the fifth exemplary embodiment, power consumption of the mobile communication system may be efficiently reduced by changing the operation state of the radio base station apparatus 1 based on the location information of the mobile terminal 4, i.e., by setting a state in which radio waves are not emitted from the radio base station apparatus 1, or by changing at least one of intensity, type, and cycle of radio waves emitted from the radio base station apparatus. Further, it is possible to prevent wasted radio waves from being emitted when there is no mobile terminal 4 in the range of the radio base station apparatus 1, thereby being capable of reducing interference with a neighborhood.

Further, since the base station apparatus 1 uses the method of periodic paging also in the fifth exemplary embodiment, it is possible to check the presence or absence in the service area in a shorter period than periodic location registration by the mobile terminal.

Other Exemplary Embodiments

Next, a radio base station apparatus and a processing apparatus according to other exemplary embodiments will be described.

Figure 22A:
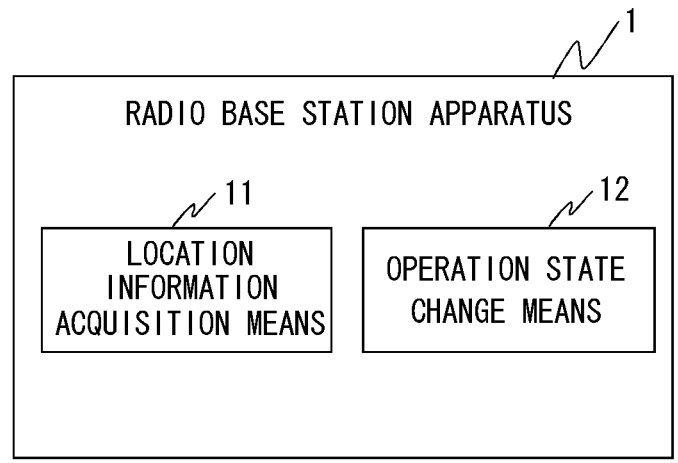
FIG. 22A is a diagram for describing a radio base station apparatus according to another exemplary embodiment.

FIG. 22A shows a radio base station apparatus according to another exemplary embodiment. A radio base station apparatus 1 according to this exemplary embodiment includes location information acquisition means 11 for acquiring location information of a mobile terminal, and operation state change means 12 for changing an operation state of the radio base station apparatus 1 based on the location information of the mobile terminal. Here, the operation state change means 12 may receive the message of at least one protocol of RANAP, HNBAP, and S1AP to change the operation state of the radio base station apparatus 1. Further, the location information acquisition means 11 is the means for acquiring the location information from an apparatus holding the location information of the mobile terminal such as the location information management apparatus 3 shown in FIG. 1, for example. Further, the operation state change means 12 is the means for outputting instructions to a circuit controlling output of radio waves of the radio base station apparatus, for example. Note that the radio base station apparatus 1 may include an apparatus for acquiring location information including a VLR 6, a location management server 9, for example, as the location information acquisition means 11. Further, the operation state change means 12 according to this exemplary embodiment may change the operation state by changing at least one of intensity, type, and cycle of radio waves emitted from the radio base station apparatus or by setting the radio base station apparatus 1 in such a manner that the radio base station apparatus 1 does not emit radio waves based on the location information of the mobile terminal.

Figure 22B:
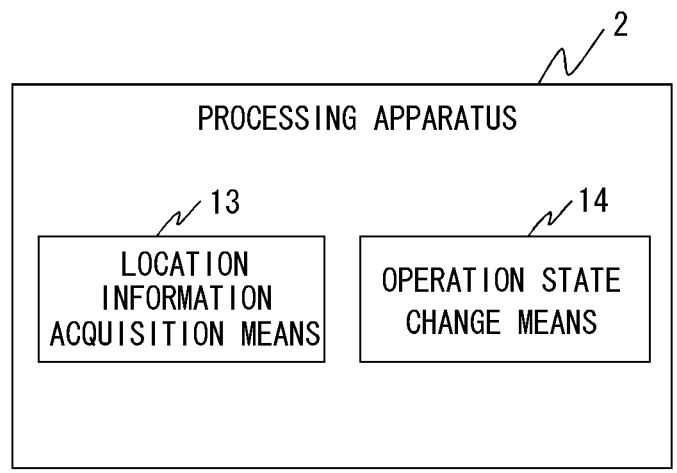
FIG. 22B is a diagram for describing a processing apparatus according to another exemplary embodiment.
Figure 23:
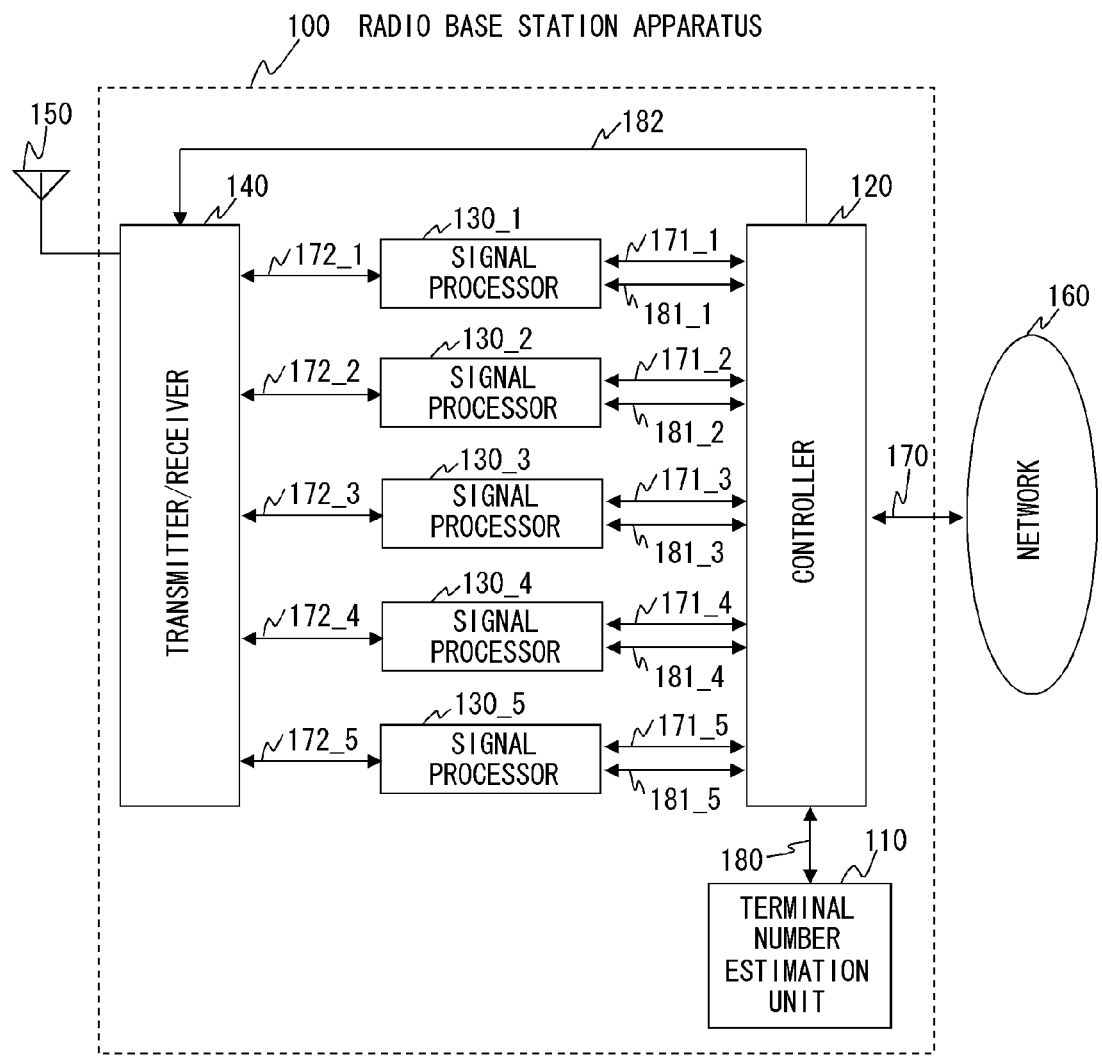
FIG. 23 is a diagram for describing a mobile communication system according to a related art.

Next, FIG. 22B shows a processing apparatus according to this exemplary embodiment. A processing apparatus 2 according to this exemplary embodiment includes location information acquisition means 13 for acquiring location information of a mobile terminal, and operation state change means 14 for changing an operation state of the radio base station apparatus based on the location information of the mobile terminal. Now, the operation state change means 14 may transmit the message of at least one protocol of RANAP, HNBAP, and S1AP to change the operation state of the radio base station apparatus. Further, the location information acquisition means 13 is the means for acquiring the location information from the apparatus holding the location information of the mobile terminal like the location information management apparatus 3 shown in FIG. 1, for example. Further, the operation state change means 14 is the means for outputting instructions to a circuit for controlling output of radio waves of the radio base station apparatus, for example. The processing apparatus 2 may include an apparatus for acquiring location information such as a VLR, and a location management server, for example, as the location information acquisition means 13. Further, the operation state change means 14 according to this exemplary embodiment may change the operation state by changing at least one of intensity, type, and cycle of radio waves emitted from the radio base station apparatus or by setting the radio base station apparatus in such a manner that the radio base station apparatus does not emit radio waves based on the location information of the mobile terminal.

It is possible to reduce power consumption in the radio base station apparatus also by the radio base station apparatus and the processing apparatus according to this exemplary embodiment.

Note that the present invention is not limited to the exemplary embodiments stated above, but may be changed as appropriate without departing from the spirit of the present invention. For example, according to the second exemplary embodiment, the processing apparatus 2 detecting that the boundary of the LA 8 is crossed changes the operation state of the radio base station apparatus 1. However, it is also possible for the processing apparatus 2 to detect that the boundary of the routing area (RA) formed of a plurality of cells is crossed as is the same to the LA 8 to change the operation state of the radio base station apparatus 1. In this case, the SGSN serves as the VLR 6.

Further, the operation state of the radio base station apparatus 1 may be changed by combining the second exemplary embodiment and the third exemplary embodiment.

Further, such a system may also be included in the present invention that turns on/off a power supply of a device connected to an external network through a device corresponding to the radio base station apparatus 1. Accordingly, it is possible to change the operation state of a domestic information appliance according to the location of the mobile terminal 4, for example.

Described in the above exemplary embodiments is to use the location information of the mobile terminal in order to efficiently reduce power consumption of the radio base station apparatus. However, the present invention is not limited to the configurations described in the exemplary embodiments stated above. For example, it is also possible to reduce power consumption of other radio base station apparatuses around the radio base station apparatus 1. Specifically, when the location information of the mobile terminal 4 is changed and the operation state of the radio base station apparatus 1 is changed, the information of the radio base station apparatus 1 (a cell ID, a Home NodeB ID (HNB ID), a scrambling code, a physical cell ID (PCI) or the like) held in another radio base station apparatus which is located near the radio base station apparatus 1 is updated, and another radio base station apparatus changes the operation state based on the updated information. As a result, it is possible to reduce power consumption of another radio base station apparatus around the radio base station apparatus 1.

Note that, in this specification, "emitting radio waves" can also be expressed as "transmitting a radio signal".

While the present invention has been described according to the exemplary embodiments stated above, the present invention is not limited to the configurations of the exemplary embodiments stated above but naturally includes various changes, modifications, or combination that can be made by a person skilled in the art within the range of the claims of the present application.

This application claims the benefit of priority, and incorporates herein by reference in its entirety, the following Japanese Patent Application No. 2009-230859 filed on Oct. 2, 2009.

INDUSTRIAL APPLICABILITY

The present invention may be broadly used in the field of mobile communication system.

REFERENCE SIGNS LIST

1 Radio Base Station Apparatus
2 Processing Apparatus
3 Location Information Management Apparatus
4 Mobile Terminal
5 Service Area
6 VLR
8 LA
9 Location Management Server
11, 13 Location Information Acquisition Means
12, 14 Operation State Change Means

The invention claimed is:

1. A mobile communication system comprising:
   a radio base station apparatus configured to perform communication with a mobile terminal;
   a location information management apparatus configured to acquire location information of the mobile terminal; and
   a processing apparatus configured to change an operation state of the radio base station apparatus by changing at least one of intensity, type, and cycle of radio waves emitted from the radio base station apparatus or by setting the radio base station apparatus in such a manner that the radio base station apparatus does not emit radio waves based on location information of the mobile terminal acquired by the location information management apparatus,
   wherein the processing apparatus is configured to determine a parameter of a message of a protocol supported by the radio base station apparatus and notify the radio base station apparatus of the message, and
   wherein the radio base station apparatus is configured to receive the message from the processing apparatus and change the operation state based on the parameter of the message.

2. The mobile communication system according to claim 1, wherein
   the radio base station apparatus supports at least one protocol of RANAP, HNBAP, and S1AP, and
   the processing apparatus is configured to change the operation state of the radio base station apparatus using at least one protocol of the RANAP, HNBAP, and S1AP.

3. The mobile communication system according to claim 1, wherein the processing apparatus is configured to turn off a power supply of the radio base station apparatus to change the operation state of the radio base station apparatus.

4. The mobile communication system according to claim 1, wherein the processing apparatus is configured to change the operation state in such a way that the radio base station apparatus does not emit radio waves when the mobile terminal moves from a position within a service area of the radio base station apparatus to a position outside the service area.

5. The mobile communication system according to claim 2, wherein a message used to change the operation state of the radio base station apparatus is:
   at least one of OPERATIONAL STATE CHANGE, UE EXISTENCE INDICATION, and INQUIRE UE EXISTENCE when the protocol is RANAP;
   at least one of HNB DEREGISTER, HNB CONFIGURATION, UE EXISTENCE INDICATION, and INQUIRE UE EXISTENCE when the protocol is HNBAP; and
   at least one of OPERATIONAL STATE CHANGE, UE EXISTENCE INDICATION, and INQUIRE UE EXISTENCE when the protocol is S1AP.

6. The mobile communication system according to claim 1, wherein the location information management apparatus is a VLR that supports a MAP.

7. The mobile communication system according to claim 1, wherein the location information management apparatus is a location management server for storing positioning information of the mobile terminal acquired from a GPS, and the location management server supports a MAP or a SIP.

8. The mobile communication system according to claim 1, wherein the radio base station apparatus is configured to autonomously execute periodic paging to check presence or absence of the mobile terminal in a certain area, and hold location information of the mobile terminal in the location information management apparatus upon acquiring the location information.

9. The mobile communication system according to claim 1, wherein the radio base station apparatus is configured to autonomously change the operation state based on the information from the processing apparatus.

10. The mobile communication system according to claim 1, wherein the processing apparatus and the location information management apparatus are provided inside the radio base station apparatus.

11. A radio base station apparatus comprising:
    location information acquisition means for acquiring location information of a mobile terminal; and
    operation state change means for changing an operation state of the radio base station apparatus by changing at least one of intensity, type, and cycle of radio waves emitted from the radio base station apparatus or by setting the radio base station apparatus in a such a manner that the radio base station apparatus does not emit radio waves based on the location information of the mobile terminal,
    wherein the operation state change means receives a message of a protocol supported by the radio base station apparatus and changes the operation state based on a parameter of the message.

12. The radio base station apparatus according to claim 11, wherein the operation state change means receives a message of at least one protocol of RANAP, HNBAP, and S1AP to change the operation state of the radio base station apparatus.

13. The radio base station apparatus according to claim 12, wherein the message used to change the operation state of the radio base station apparatus is:

at least one of OPERATIONAL STATE CHANGE, UE EXISTENCE INDICATION, and INQUIRE UE EXISTENCE when the protocol is RANAP;

at least one of HNB DEREGISTER and HNB CONFIGURATION of HNBAP, UE EXISTENCE INDICATION, and INQUIRE UE EXISTENCE when the protocol is HNBAP; and at least one of OPERATIONAL STATE CHANGE, UE EXISTENCE INDICATION, and INQUIRE UE EXISTENCE when the protocol is S1AP.

14. A processing apparatus comprising:

location information acquisition means for acquiring location information of a mobile terminal; and operation state change means for changing an operation state of the radio base station apparatus by changing at least one of intensity, type, and cycle of radio waves emitted from the radio base station apparatus or by setting the radio base station apparatus in such a manner that the radio base station apparatus does not emit radio waves based on the location information of the mobile terminal, wherein the operation state change means changes the operation state by determining a parameter of a message of a protocol supported by the radio base station apparatus to notify the radio base station apparatus of the message.

15. The processing apparatus according to claim 14, wherein the operation state change means transmits a message of at least one protocol of RANAP, HNBAP, and S1AP to change the operation state of the radio base station apparatus.

16. The processing apparatus according to claim 15, wherein the message used to change the operation state is:

OPERATIONAL STATE CHANGE when the protocol is RANAP;

at least one of HNB DEREGISTER and HNB CONFIGURATION when the protocol is HNBAP; and OPERATIONAL STATE CHANGE when the protocol is S1AP.

17. A method of controlling a mobile communication system comprising:

acquiring location information of a mobile terminal for performing communication with a radio base station apparatus; and changing an operation state of the radio base station apparatus by changing at least one of intensity, type, and cycle of radio waves emitted from the radio base station apparatus or by setting the radio base station apparatus in such a manner that the radio base station apparatus does not emit radio waves based on a parameter of a message of a protocol supported by the radio base station apparatus and based on the location information of the mobile terminal.

18. The method of controlling the mobile communication system according to claim 17, wherein the radio base station apparatus supports at least one protocol of RANAP, HNBAP, and S1AP.

19. The method of controlling the mobile communication system according to claim 17, comprising turning off the power supply of the radio base station apparatus to change the operation state of the radio base station apparatus.

20. The method of controlling the mobile communication system according to claim 17, comprising changing the operation state in such a way that the radio base station apparatus does not emit radio waves when the mobile terminal moves from a position within a service area of the radio base station apparatus to a position outside the service area.

21. The method of controlling the mobile communication system according to claim 18, wherein the message used to change the operation state of the radio base station apparatus is:

at least one of OPERATIONAL STATE CHANGE, UE EXISTENCE INDICATION, and INQUIRE UE EXISTENCE when the protocol is RANAP;

at least one of HNB DEREGISTER, HNB CONFIGURATION, UE EXISTENCE INDICATION, and INQUIRE UE EXISTENCE when the protocol is HNBAP; and at least one of OPERATIONAL STATE CHANGE, UE EXISTENCE INDICATION, and INQUIRE UE EXISTENCE when the protocol is S1AP.

* * * * *